(12) United States Patent
Nagata et al.

(10) Patent No.: US 9,351,177 B2
(45) Date of Patent: May 24, 2016

(54) MOBILE TERMINAL APPARATUS, RADIO BASE STATION APPARATUS, RADIO COMMUNICATION METHOD AND RADIO COMMUNICATION SYSTEM

(75) Inventors: Satoshi Nagata, Tokyo (JP); Xiang Yun, Beijing (CN); Xiaoming She, Beijing (CN); Lan Chen, Beijing (CN)

(73) Assignee: NTT DOCOMO, INC, Tokyo (JP)

( * ) Notice: Subject to any disclaimer, the term of this patent is extended or adjusted under 35 U.S.C. 154(b) by 240 days.

(21) Appl. No.: 14/110,738

(22) PCT Filed: Apr. 12, 2012

(86) PCT No.: PCT/JP2012/060054
§ 371 (c)(1),
(2), (4) Date: Oct. 9, 2013

(87) PCT Pub. No.: WO2012/141257
PCT Pub. Date: Oct. 18, 2012

(65) Prior Publication Data
US 2014/0029465 A1 Jan. 30, 2014

(30) Foreign Application Priority Data
Apr. 15, 2011 (JP) ................................. 2011-091452

(51) Int. Cl.
| H04W 4/00 | (2009.01) |
| H04W 24/02 | (2009.01) |
| H04B 7/02 | (2006.01) |
| H04B 7/06 | (2006.01) |
| H04B 7/04 | (2006.01) |
| H04W 72/08 | (2009.01) |

(52) U.S. Cl.
CPC .............. *H04W 24/02* (2013.01); *H04B 7/024* (2013.01); *H04B 7/0456* (2013.01); *H04B 7/063* (2013.01); *H04B 7/0632* (2013.01); *H04B 7/0639* (2013.01); *H04W 72/082* (2013.01)

(58) Field of Classification Search
CPC ...................................................... H04W 24/00
USPC ................................... 370/252, 328, 332, 334
See application file for complete search history.

(56) References Cited

U.S. PATENT DOCUMENTS

2013/0272442 A1* 10/2013 Nilsson et al. ................ 375/267

OTHER PUBLICATIONS

Office Action for Japanese Application No. 2011-091452, issued May 28, 2013, with English translation thereof (6 pages).

(Continued)

*Primary Examiner* — Christopher R Crompton
(74) *Attorney, Agent, or Firm* — Osha Liang LLP

(57) ABSTRACT

The present invention is designed to provide a mobile terminal apparatus, a radio base station apparatus and a radio communication method which, even when a MIMO technique and a CoMP technique are applied together, can optimize the effects of both techniques. The mobile terminal apparatus estimates downlink channel states using reference signals included in downlink signals from a plurality of cells, determines the PMI for each cell and inter-cell phase difference information, from the channel states of the plurality of cells, such that the combinations of the PMI of each cell and inter-cell phase difference information become optimal, measures channel quality from the determined PMIs and inter-cell phase difference information, and transmits the PMI for each cell, the inter-cell phase difference information and channel quality information, to a radio base station apparatus.

16 Claims, 13 Drawing Sheets

(56) References Cited

OTHER PUBLICATIONS

International Search Report for corresponding International Application No. PCT/JP2012/060054, mailed Jul. 10, 2012 (3 pages).
3GPP TR 25.912 V7.1.0; "3rd Generation Partnership Project; Technical Specification Group Radio Access Network; Feasibility study for evolved Universal Terrestrial Radio Access (UTRA) and Universal Terrestrial Radio Access Network (UTRAN) (Release 7)"; Sep. 2006 (57 pages).
NTT Docomo; "System performance for JP-CoMP in Homogeneous Networks with high Tx power RRHs"; 3GPP TSG RAN WG1 Meeting #64, R1-11147; Taipei, Taiwan; Feb. 21-25, 2011 (8 pages).

* cited by examiner

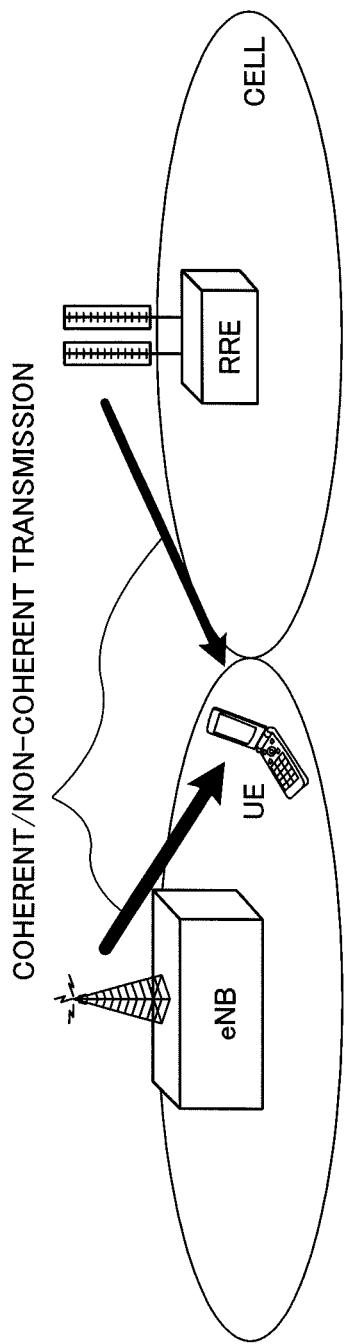
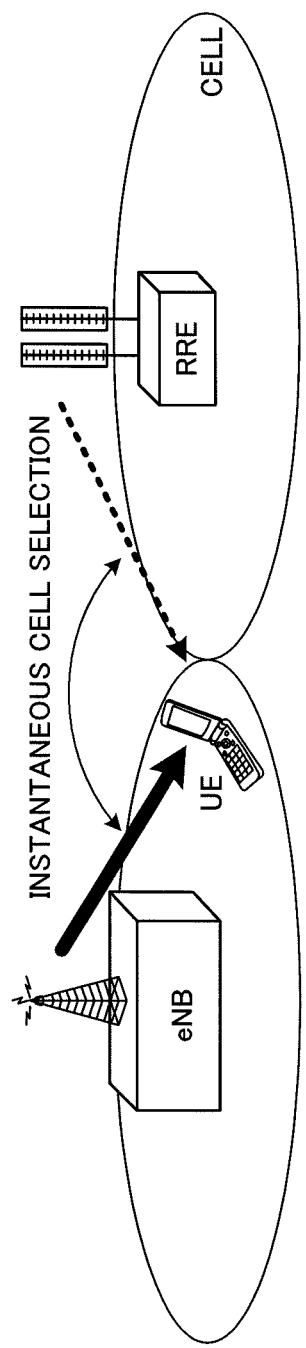
FIG. 1A
FIG. 1B

MOBILE TERMINAL APPARATUS, RADIO BASE STATION APPARATUS, RADIO COMMUNICATION METHOD AND RADIO COMMUNICATION SYSTEM

TECHNICAL FIELD

The present invention relates to a mobile terminal apparatus, a radio base station apparatus, a radio communication method and a radio communication system in a next-generation mobile communication system.

BACKGROUND ART

In a UMTS (Universal Mobile Telecommunications System) network, for the purposes of improving spectral efficiency and improving the data rates, system features based on W-CDMA (Wideband Code Division Multiple Access) are maximized by adopting HSDPA (High Speed Downlink Packet Access) and HSUPA (High Speed Uplink Packet Access). For this UMTS network, for the purposes of further increasing high-speed data rates, providing low delay and so on, long-term evolution (LTE) has been under study (non-patent literature 1).

In a system of the LTE scheme, a MIMO (Multi Input Multi Output) system to improve the data rate (spectral efficiency) by transmitting and receiving data by a plurality of antennas is proposed (see, for example, non-patent literature 1). In MIMO transmission, a receiver selects optimal PMIs, from a codebook in which a plurality of amounts of phase/amplitude control (precoding matrices (precoding weights)) to be set in the antennas of a transmitter and a plurality of PMIs (Precoding Matrix Indicators) to be associated with the precoding matrices are defined on a per rank basis, and feeds the optimal PMIs back to the transmitter. Also, the receiver select and feeds back RIs (Rank Indicator), which represent optimal ranks, to the transmitter. The transmitter specifies the precoding weight for each transmitting antenna based on the PMIs and RIs fed back from the receiver, performs precoding, and transmits transmission information sequences.

Also, in a system of the LTE scheme, time domain/frequency domain/space domain scheduling relies on downlink channel conditions. Consequently, to allow the transmitter to perform optimal scheduling, the receiver reports the channel state. As parameters to report this channel state, there are the above PMIs, and downlink quality information (CQI: Channel Quality Indicator) for use in adaptive modulation/demodulation and coding process (AMC: Adaptive Modulation and Coding scheme). Scheduling is executed by feeding back these PMIs and CQI (channel state information (CSI) or feedback information) from the receiver to the transmitter.

CITATION LIST

Non-Patent Literature

Non-Patent Literature 1: 3GPP, TR25.912 (V7.1.0), "Feasibility study for Evolved UTRA and UTRAN," September 2006

SUMMARY OF INVENTION

Technical Problem

In the third-generation mobile communication system, it is possible to achieve a transmission rate of maximum approximately 2 Mbps on the downlink by using a fixed band of approximately 5 MHz. In the system of the LTE scheme, it is possible to achieve a transmission rate of about maximum 300 Mbps on the downlink and about 75 Mbps on the uplink by using a variable band which ranges from 1.4 MHz to 20 MHz. In the UMTS network, for the purpose of achieving further broadbandization and higher speed, successor systems of LTE have been under study (for example, LTE-Advanced (LTE-A) system).

As a promising technique for further improving the system performance of the Rel-8 LTE system, there is inter-cell orthogonalization. In the LTE system of Rel-10 (LTE-A system) or later versions, intra-cell orthogonalization is made possible by orthogonal multiple access on both the uplink and the downlink. That is to say, on the downlink, orthogonalization is provided between mobile terminal apparatuses (UEs: User Equipment) in the frequency domain. However, between cells, like W-CDMA, interference randomization by repeating one-cell frequency is fundamental.

In the 3GPP (3rd Generation Partnership Project), coordinated multiple-point transmission/reception (CoMP) is under study as a technique for realizing inter-cell orthogonalization. In CoMP transmission/reception, a plurality of cells coordinate and perform signal processing for transmission and reception for one mobile terminal apparatus UE or a plurality of mobile terminal apparatuses UEs. To be more specific, in downlink transmission, simultaneous transmission of plurality of cells where precoding is applied, coordinated scheduling, beamforming and so on are under study.

In CoMP transmission/reception, CQI for using AMC is used in downlink transmission. Consequently, when a MIMO technique and a CoMP technique are applied together, it is desirable to optimize the effects of both techniques by feeding back feedback information such as PMI, CQI and so on accurately, from a receiver to a transmitter.

The present invention has been made in view of the above, and it is therefore an object of the present invention to provide a mobile terminal apparatus, a radio base station apparatus, a radio communication method and a radio communication system which can optimize the effects of both a MIMO technique and a CoMP technique when these techniques are applied together.

Solution to Problem

A mobile terminal apparatus according to the present invention has: an estimation section that estimates channel states of a plurality of cells using reference signals included in downlink signals from the plurality of cells; a determining section that determines a PMI (Precoding Matrix Indicator) of each cell and inter-cell phase difference information, from the channel states of the plurality of cells, such that combinations of the PMI of each cell and the inter-cell phase difference information become optimal; a measurement section that measures channel quality from the PMIs and inter-cell phase difference information determined in the determining section; and a transmission section that transmits the PMI of each cell, the inter-cell phase difference information and information about the channel quality, to a radio base station.

A radio base station apparatus according to the present invention has: a receiving section that receives an uplink signal including a PMI and inter-cell phase difference information; a multiplying section that multiples a transmission signal by a precoding weight of the PMI; a phase difference adjusting section that adjusts phase differences between cells using the inter-cell phase difference information; and a transmission section that performs coordinated multiple-point transmission of the transmission signal, and, in this radio base station apparatus, the PMI and the inter-cell phase difference information are information that is determined from channel states of the plurality of cells that perform the coordinated multiple-point transmission such that combinations of the PMI (Precoding Matrix Indicator) of each cell and inter-cell phase difference information become optimal.

A radio communication method according to the present invention includes, in a mobile terminal apparatus, the steps of: estimating downlink channel states using reference signals included in downlink signals from a plurality of cells; determining a PMI (Precoding Matrix Indicator) of each cell and inter-cell phase difference information, from channel states of the plurality of cells, such that combinations of the PMI of each cell and the inter-cell phase difference information become optimal; measuring channel quality from the determined PMIs and the inter-cell phase difference information; and transmitting the PMI of each cell, the inter-cell phase difference information and channel quality information, to a radio base station.

A radio communication system according to the present invention transmits transmission signals from radio base station apparatuses of a plurality of cells to a mobile terminal apparatus, and, in this radio communication system: the mobile terminal apparatus: estimates channel states of the plurality of cells using reference signals included in downlink signals from the plurality of cells; determines a PMI (Precoding Matrix Indicator) of each cell and inter-cell phase difference information, from the channel states of the plurality of cells, such that combinations of the PMI of each cell and the inter-cell phase difference information become optimal; measures channel quality from the determined PMIs and the inter-cell phase difference information; and transmitting the PMI of each cell, the inter-cell phase difference information and information about the channel quality, to a radio base station; and the base station apparatuses of the plurality of cells: generate transmission signals based on the PMI of each cell, the inter-cell phase difference information and the channel quality information transmitted from the mobile terminal apparatus; and transmit the transmission signals to the mobile terminal apparatus.

Technical Advantage of the Invention

According to the present invention, a mobile terminal apparatus is able to determine the PMI of each cell and inter-cell phase difference information such that the combinations of the PMI of each cell and inter-cell phase difference information become optimal, from the downlink channel states of a plurality of cells, so that it is possible to determine PMI, inter-cell phase difference information and channel quality information with high accuracy. By this means, when a MIMO technique and a CoMP technique are applied together, it is possible to optimize the effects of both techniques.

BRIEF DESCRIPTION OF THE DRAWINGS

FIG. 1 provides diagrams to explain coordinated multiple-point transmission.

DESCRIPTION OF EMBODIMENTS

An embodiment of the present invention will be described below in detail with reference to the accompanying drawings. First, downlink CoMP transmission will be described. Downlink CoMP transmission includes coordinated scheduling/coordinated beamforming, and joint processing. Coordinated scheduling/coordinated beamforming is a method of transmitting from only one cell to one mobile terminal apparatus UE, and is a method of allocating radio resources in the frequency/space domain taking into account interference from other cells and interference against other cells. Joint processing refers to simultaneous transmission of a plurality of cells where precoding is applied, and includes joint transmission to transmit from a plurality of cells to one mobile terminal apparatus UE as shown in FIG. 1A, and dynamic cell selection to select cells instantaneously as shown in FIG. 1B.

Figure 2A:
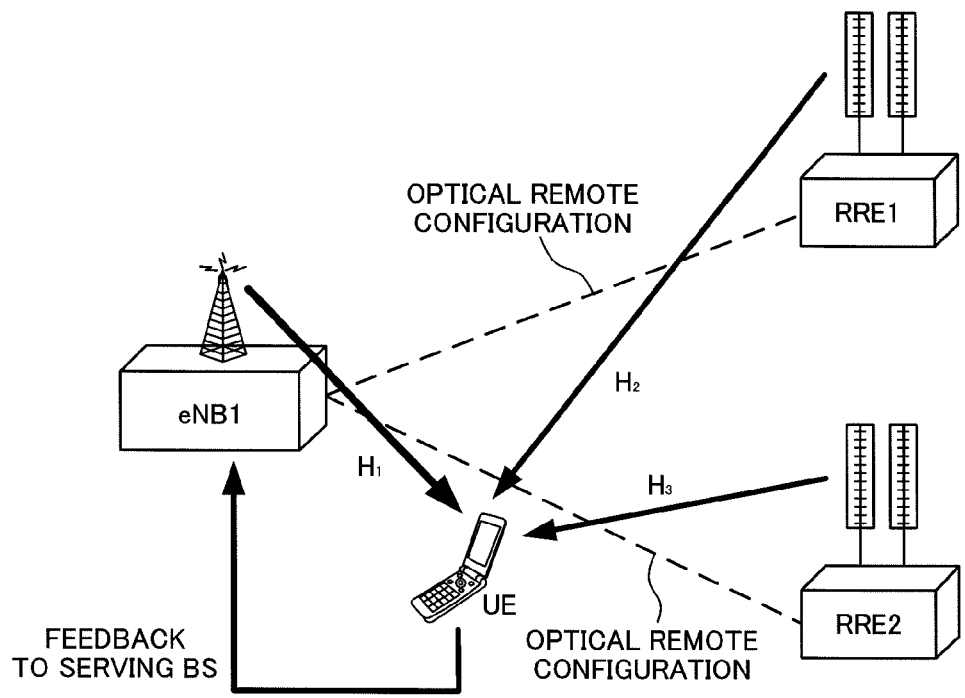
FIG. 2 provides diagrams to explain a configuration of radio base station apparatuses.

As a configuration to realize CoMP transmission/reception, as shown in FIG. 2A, there is a configuration (centralized control based on a remote radio equipment configuration) to include a radio base station apparatus (radio base station apparatus eNB) and a plurality of remote radio equipment (RREs) that are connected with the radio base station apparatus eNB by an optical remote configuration (optical fiber). Besides, there is a configuration of a radio base station apparatus (radio base station apparatus eNB) (autonomous distributed control based on an independent base station configuration), as shown in FIG. 2B.

In the configuration shown in FIG. 2A (RRE configuration), remote radio equipment RRE 1 and RRE 2 are controlled in a centralized fashion in a radio base station apparatus eNB. In the RRE configuration, the radio base station apparatus eNB as a centralized base station performs baseband signal processing and control for a plurality of RREs. In the RRE configuration, the radio base station apparatus eNB and each cell—that is, RRE—are connected by baseband signals using optical fiber. Accordingly the centralized base station can be executed the radio resource control between the cells altogether.

Figure 2B:
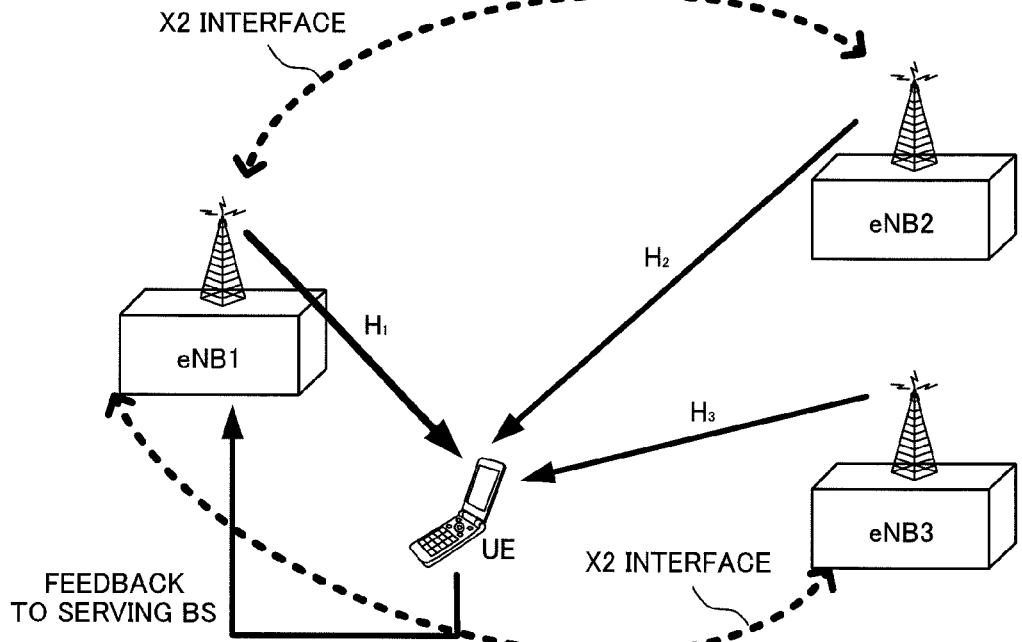

In the configuration shown in FIG. 2B, radio resource allocation control such as scheduling is performed in each of a plurality of radio base station apparatus eNBs (or RREs). In this case, by using the X2 interfaces between the radio base station apparatus eNB 1 to eNB 3, radio resource allocation information such as timing information and scheduling is transmitted to each radio base station apparatus in accordance with need, thereby coordinating between the cells.

Figure 3:
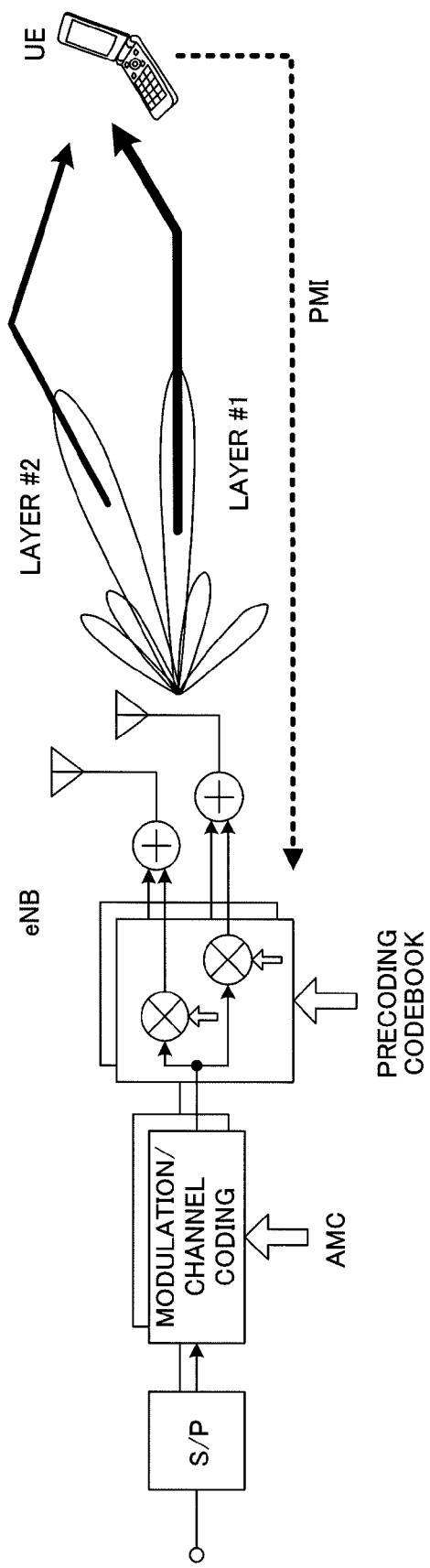
FIG. 3 is a diagram to explain a MIMO technique.

A MIMO technique will be described. In precoding in downlink MIMO transmission in the MIMO system shown in FIG. 3, a mobile terminal apparatus UE measures the amount of channel variation (channel state) using a received signal from each antenna. Next, based on the measured amount of channel variation, the PMI (Precoding Matrix Indicator) and RI (Rank Indicator) corresponding to the amount of phase/amplitude control (precoding weight) to maximize the throughput (or received SINR (Signal to Interference and Noise Ratio)) after the transmission data from each transmitting antenna of the radio base station apparatus eNB is combined, are selected. Then, the selected PMI and RI are fed back to the radio base station apparatus eNB on the uplink with channel quality information (CQI: Channel Quality Indicator).

The radio base station apparatus eNB performs channel coding and data modulation of transmission signals (AMC: Adaptive Modulation and Coding), and performs precoding of transmission data based on the PMI and RI that are fed back from the mobile terminal apparatus UE. By this means, the phase/amplitude is controlled (shifted) on a per transmitting antenna basis. After this, transmission data given the phase/amplitude shift is transmitted from each antenna.

When the above-described MIMO technique and CoMP technique are applied together, a mobile terminal apparatus UE preferably feeds back information (inter-cell information) including, for example, phase difference information between a plurality of cells that perform CoMP transmission/reception, in addition to the PMI corresponding to each cell, to the radio base station apparatus eNB. As for channel quality information, the mobile terminal apparatus UE preferably measures the CQI (CoMP CQI) corresponding to a plurality of cells that perform communication when CoMP transmission/reception is applied, in addition to the CQI (single-cell CQI) corresponding to the serving cell, and transmit these to the radio base station apparatus. As for the information about phase differences and so on between cells (hereinafter referred to as "inter-cell phase difference information") and channel quality information corresponding to a plurality of cells, which becomes necessary when CoMP transmission/reception is applied, it is possible to improve the communication quality by sending feedback to the radio base station apparatus.

The inter-cell phase difference information refers to phase difference information and so on between the serving cell and other cells, and can be determined by calculating phase difference information from the PMI or channel state of each cell. The inter-cell phase difference information may include information related to the amplitude, in addition to information about phase differences between cells.

Figure 4:
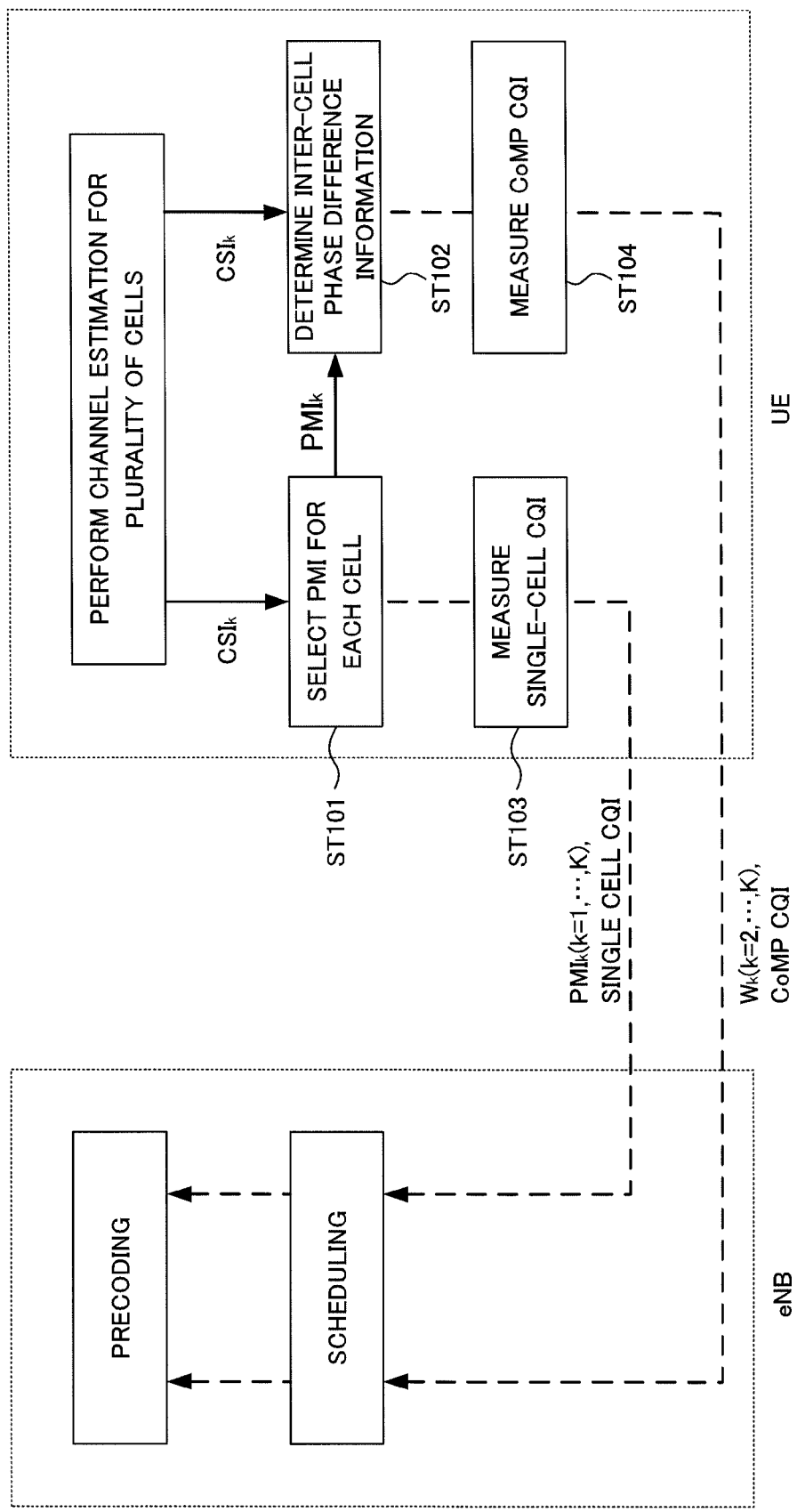
FIG. 4 is a diagram to explain a method of determining PMI, inter-cell phase difference information and CQI (reference example)

When the PMI for each cell, inter-cell phase difference information, the CQI for the serving cell and the CQI for a plurality of cells are fed back to a radio base station apparatus, a method of determining various pieces of information using the following equations 1 to 4 in the mobile terminal apparatus UE is under study (see FIG. 4).

<Selection of PMI of Each Cell>

First, a mobile terminal apparatus UE estimates the channel states of a plurality of cells, using the reference signals included in downlink signals from the plurality of cells. Then, the mobile terminal apparatus UE determines the PMI of each cell from the channel state of each cell, using the following equation 1 (step ST 101). In this case, the mobile terminal apparatus UE selects an optimal PMI per cell, using a codebook in which a plurality of PMIs are defined on a per rank basis. By this means, the PMI for each cell is quantized.

[Formula 1]

$$\hat{P}_k = \underset{1 \leq j_k \leq 2^N}{\operatorname{argmax}} \|H_k \cdot P_{j_k}\|^2, k = 1, \ldots, K \quad \text{(Equation 1)}$$

where
j: codebook index of PMI
N: codebook size of PMI (bits)
$H_k$: channel state of each cell
$P_{jk}$: codeword index in cell k
K: the number of cells included in CoMP transmission <Determining Inter-Cell Phase Difference Information W>

Next, the mobile terminal apparatus UE calculates inter-cell phase difference information. To be more specific, inter-cell phase difference information is determined from the following equations 2 using the PMI of each cell that has been selected using the equation 1 (step ST 102). In the equations 2, from the channel states corresponding to a plurality of cells, inter-cell phase difference information W is calculated taking into account the combinations of the PMI of each cell quantized by the above equation 1 and inter-cell phase difference information (joint selection). The inter-cell phase difference information W corresponds to the phase difference information and so on between the serving cell (eNB 1 in FIG. 2B) and other cells (eNBs 2 and 3 in FIG. 2B), and, for example, $W_2$ corresponds to the phase difference information between eNB 1 and eNB 2.

[Formula 2]

$$\{\hat{W}_2, \ldots, \hat{W}_K\} = \underset{1 \leq i_2, \ldots, i_K \leq 2^M}{\operatorname{argmax}} \|H \cdot P\|^2 \quad \text{(Equation 2)}$$

$$P = \left[\hat{P}_1^H, W_{i_2}\hat{P}_2^H, \ldots, W_{i_K}\hat{P}_K^H\right]^H$$

where
W: phase difference information between the serving cell and CoMP cells
H: the channel states of a plurality of cells, $H=[H_1, H_2, \ldots, H_K]$
K: the number of cells included in CoMP transmission
i: codeword index in inter-cell phase difference information
M: codebook size (bits) in inter-cell phase difference information <Measurement of Single-Cell CQI>

Next, using the PMI of the serving cell acquired from the equation 1, the CQI (single-cell CQI) of the serving cell is measured from the following equation 3 (step ST 103).

[Formula 3]

$$\gamma_{SC}^l = f(\hat{P}_1, H_1) = P_T/L \cdot \|r^l \cdot H_1 \hat{P}_1\|^2/(N+ICI) \quad \text{(Equation 3)}$$

where
$H_1$: the channel state of the serving cell
$P_T$: the transmission power from the radio base station apparatus
L: rank
r: received signal
l: layer index
N: average noise of the receiver in the mobile terminal apparatus ICI: interference from cells other than the serving cell against the mobile terminal apparatus <Measurement of CoMP CQI>

Also, using the PMI of each cell and inter-cell phase difference information acquired from the equation 1 and the equations 2, the CQI (CoMP CQI) to correspond to a plurality of cells is measured from the following equation 4 (step ST 104).

[Formula 4]

$$\gamma_{JP}^l = g(\hat{P}_k, \hat{W}_k, H) = KP_T/L \cdot \|r^J \cdot HP\|^2/(N+ICI') \quad \text{(Equation 4)}$$

where

K: the number of cells included in CoMP transmission $P_T$: the transmission power from the radio base station apparatus L: rank r: received signal H: the channel states of a plurality of cells, H=[$H_1$, $H_2$, ..., $H_K$]

N: average noise of the receiver in the mobile terminal apparatus

ICI': interference from cells not belonging to the CoMP set, in the mobile terminal apparatus However, with the above-described method, when inter-cell phase difference information is determined using the equations 2, the PMIs, which have been each quantized based on the channel state of each cell using the equation 1, are used. Consequently, presuming CoMP transmission/reception, there is a threat that the accuracy of the PMI of each cell and inter-cell phase difference information, which are determined using the above equation 1 and equations 2, is insufficient (not optimal selections).

Furthermore, when the CQI (CoMP CQI) of a plurality of cells is measured using the PMI of each cell and inter-cell phase difference information determined using the equation 1 and equations 2 (equation 4), the accuracy of the resulting CQI also decreases.

To solve the above problem, the present inventors have found out that, when determining inter-cell phase difference information and PMI, it is possible to improve the accuracy of PMI and inter-cell phase difference information (make more optimal selections), compared to the case of determining inter-cell phase difference information using the quantized PMI of each cell, by determining inter-cell phase difference information and the PMI of each cell, from the channel states of a plurality of cells, such that the combinations of inter-cell phase difference information and the PMI of each cell (joint selection) become optimal. Also, the present inventors have found out that, by measuring the CQI (CoMP CQI) of a plurality of cells using PMI and inter-cell phase difference information determined in this way, it is possible to improve the accuracy of CQIs to be acquired, and improve the communication quality when a MIMO technique and a CoMP technique are applied together.

According to one mode of the present invention, a mobile terminal apparatus estimates downlink channel states using reference signals included in downlink signals from a plurality of cells, determines the PMI of each cell and inter-cell phase difference information, from the channel states corresponding to a plurality of cells, such that the combinations of the PMI of each cell and inter-cell phase difference information become optimal, measures channel quality from the determined PMIs and inter-cell phase difference information, and transmits the PMI of each cell, inter-cell phase difference information and channel quality information, to a radio base station apparatus.

Note that, determining the PMI of each cell and inter-cell phase difference information such that the combinations of the PMI of each cell and inter-cell phase difference information become optimal, refers to selecting PMIs and inter-cell phase difference information, based on the channel states of a plurality of cells, such that the throughput (or the received SINR) is maximized. The PMIs may be selected using a codebook in which a plurality of PMIs are defined on a per rank basis, and inter-cell phase difference information may be selected using information in which inter-cell phase difference information is defined as bit information.

The method of determining the PMI corresponding to each cell, inter-cell phase difference information and channel quality information will be described below in detail.

(First Mode)

Figure 5:
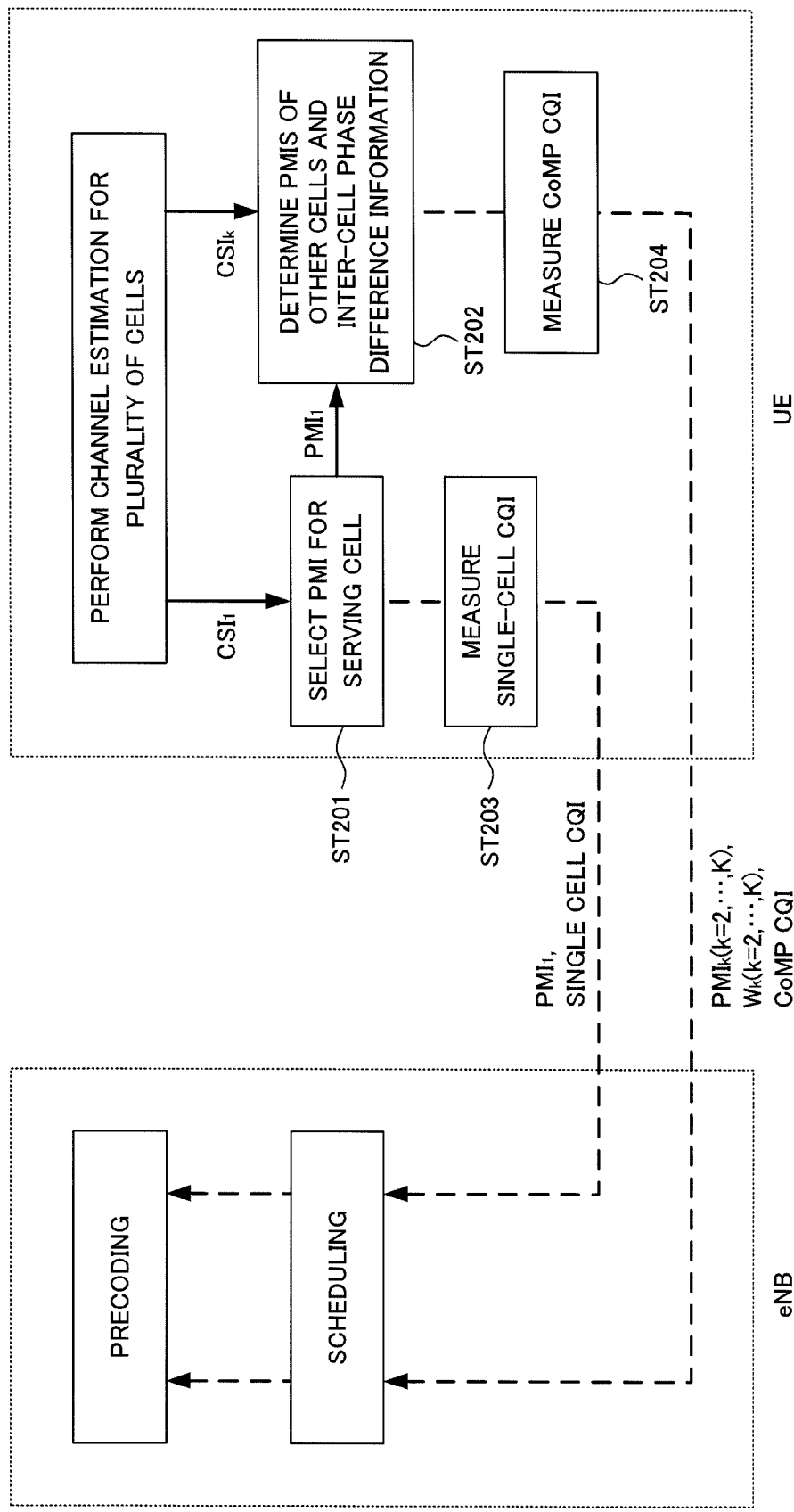
FIG. 5 is a diagram to explain a method of determining PMI, inter-cell phase difference information and CQI according to the first mode.

According to the first mode, a mobile terminal apparatus UE determines the PMI of the serving cell using a codebook from the channel state of the serving cell. Also, as for cells other than the serving cell, the PMI of each cell and inter-cell phase difference information are determined, from the channel states of a plurality of cells, such that the combinations of the PMIs of other cells and inter-cell phase difference information become optimal. Then, CQIs (single-cell CQI and CoMP CQI) are measured based on the PMI of each cell and inter-cell phase difference information. To be more specific, the mobile terminal apparatus UE determines various pieces of information using the following equations (see FIG. 5).

<Selection of the PMI of the Serving Cell>

First, the mobile terminal apparatus UE estimates the downlink channel states using reference signals included in downlink signals from a plurality of cells. Then, the mobile terminal apparatus UE selects the $PMI_1$ of the serving cell from the channel state of the serving cell ($CSI_1$) using the following equation 5 (step ST 201). In this case, the mobile terminal apparatus UE selects the optimal $PMI_1$ using a codebook in which a plurality of PMIs are defined on a per rank basis. By this means, the $PMI_1$ of the serving cell is quantized.

[Formula 5]

$$\hat{P}_1 = \underset{1 \leq j_1 \leq 2^N}{\operatorname{argmax}} \|H_1 \cdot P_{j_1}\|^2 \quad \text{(Equation 5)}$$

where j: codebook index of PMI

N: codebook size of PMI (bits)

$H_1$: the channel state of the serving cell $P_{j1}$ codeword index in the serving cell <Determining the PMIs of Other Cells and Inter-Cell Phase Difference Information W>

Next, the mobile terminal apparatus UE determines the PMIs of other cells besides the serving cell and inter-cell phase difference information. To be more specific, the PMIs of other cells and inter-cell phase difference information W are determined, from the $PMI_1$ of the serving cell acquired from the following equations 6, and the channel states of a plurality of cells (step ST 202).

[Formula 6]

$$\{\hat{P}_2, \ldots, \hat{P}_K, \hat{W}_2, \ldots, \hat{W}_K\} = \underset{1 \le i_2, \ldots, i_K \le 2^M, 1 \le j_2, \ldots, j_K \le 2^N}{\mathrm{argmax}} \|H \cdot P\|^2$$

$$P = [\hat{P}_1^H, W_{i_2} P_{j_2}^H, \ldots, W_{i_K} P_{j_K}^H]^H$$

(Equation 6)

where

K: the number of cells included in CoMP transmission i: codeword index in inter-cell phase difference information M: codebook size (bits) in inter-cell phase difference information j: codebook index in PMI codebook N: codebook size of PMI H: the channel states of a plurality of cells, $H=[H_1, H_2, \ldots, H_K]$ With the equations 6, the calculations are done such that the combinations of the PMIs of other cells and inter-cell phase difference information (joint selection) become optimal, and the PMIs of other cells are each determined and also inter-cell phase difference information is determined, using a codebook.

That is, with the equations 6, the PMIs of other cells and inter-cell phase difference information W are determined such that the combinations of the PMIs of other cells and inter-cell phase difference information W become optimal, instead of determining inter-cell phase difference information W using the PMI of each cell that is quantized in advance, like the above equations 2. Consequently, compared to the PMIs of other cells and inter-cell phase difference information determined by the above equations 1 and 2, it is possible to determine the PMIs of other cells and inter-cell phase difference information with high accuracy (make more optimal selections).

<Measurement of Single-Cell CQI>

Next, the CQI (single-cell CQI) to correspond to the serving cell is measured from the following equation 3, using the PMI for the serving cell acquired from the equation 5 (step ST 203).

[Formula 7]

$$\gamma_{SC}^l = f(\hat{P}_1, H_1) = P_T/L \cdot \|r^l \cdot H_1 \hat{P}_1\|^2 / (N + ICI)$$

(Equation 3)

where $H_1$: the channel state of the serving cell $P_T$: the transmission power from the radio base station apparatus L: rank r: received signal l: layer index N: average noise of the receiver in the mobile terminal apparatus ICI: interference from cells other than the serving cell against the mobile terminal apparatus Here, the CQI of the serving cell is determined using the $PMI_1$ of the serving cell that has been selected using the equation 5, so that it is possible to improve the accuracy of the single-cell CQI.

<Measurement of CoMP CQI>

Also, the CQI (CoMP CQI) of a plurality of cells is calculated from the following equation 4, using the PMI of each cell and inter-cell phase difference information given from the equation 5 and the equations 6 (step ST 204).

[Formula 8]

$$\gamma_{JP}^l = g(\hat{P}_k, \hat{W}_k, H) = K P_T/L \cdot \|r^l \cdot HP\|^2 / (N + ICI')$$

(Equation 4)

where

K: the number of cells included in CoMP transmission $P_T$: the transmission power from the radio base station apparatus L: rank r: received signal H: the channel states of a plurality of cells, $H=[H_1, H_2, \ldots, H_K]$ N: average noise of the receiver in the mobile terminal apparatus ICI': interference from cells not belonging to the CoMP set, in the mobile terminal apparatus Here, presuming CoMP transmission/reception, the CQI is measured based on the PMIs of other cells and inter-cell phase difference information determined from the above equations 6 using the channel states of a plurality of cells, so that it is possible to determine the CQI (CoMP CQI) of a plurality of cells.

(Second Mode)

Figure 6:
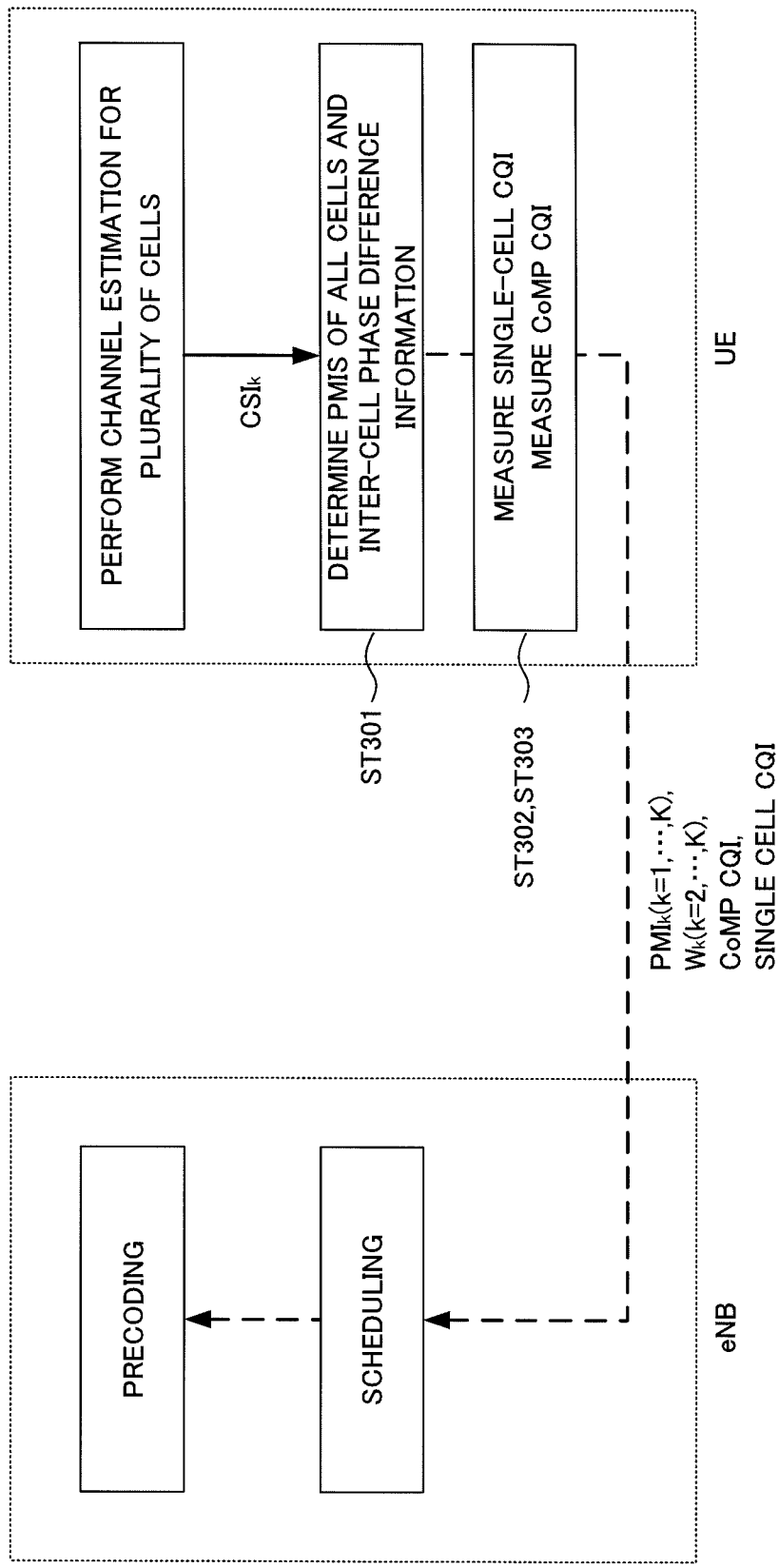
FIG. 6 is a diagram to explain a method of determining PMI, inter-cell phase difference information and CQI according to a second mode.

According to a second mode, a mobile terminal apparatus UE executes calculations from the channel states of a plurality of cells, such that the combinations of the PMI for each cell and inter-cell phase difference information become optimal with respect to all cells included in CoMP transmission including the serving cell. By this means, the PMI of each cell and inter-cell phase difference information are determined. Also, CQIs (single-cell CQI and CoMP CQI) are measured using the resulting PMI of each cell and inter-cell phase difference information. To be more specific, the mobile terminal apparatus UE is able to determine various pieces of information using the following equations (see FIG. 6).

<Determining PMI to Corresponds to all Cells, and Inter-Cell Phase Difference Information W>

First, a mobile terminal apparatus UE estimates the downlink channel states using reference signals included in downlink signals from a plurality of cells. Then, the mobile terminal apparatus UE determines the PMIs of all cells including the serving cell, and inter-cell phase difference information, from the channel states of a plurality of cells using the following equations 7 (step ST 301).

[Formula 9]

$$\{\hat{P}_1, \hat{P}_2, \ldots, \hat{P}_K, \hat{W}_2, \ldots, \hat{W}_K\} = \underset{1 \le i_2, \ldots, i_K \le 2^M, 1 \le j_1, \ldots, j_K \le 2^N}{\mathrm{argmax}} \|H \cdot P\|^2$$

$$P = [P_{j_1}^H, W_{i_2} P_{j_2}^H, \ldots, W_{i_K} P_{j_K}^H]^H$$

(Equation 7)

where

K: the number of cells included in CoMP transmission i: codeword index in inter-cell phase difference information M: codebook size (bits) in inter-cell phase difference information j: codebook index in PMI codebook N: codebook size of PMI H: the channel states of a plurality of cells, $H=[H_1, H_2, \ldots, H_K]$ In the equations 7, the PMI for the serving cell is determined using the channel states of a plurality of cells, and also the PMIs of other cells and inter-cell phase difference information W are determined such that the combinations of the PMIs of other cells and inter-cell phase difference information (joint selection) become optimal (step ST 301).

That is, with the equations 7, the PMI of each cell and inter-cell phase difference information W are determined from the channel states of a plurality of cells, instead of determining inter-cell phase difference information W using the PMI of each cell that is quantized in advance like the above equations 2. Consequently, compared to the PMIs of other cells and inter-cell phase difference information that are determined by the above equations 1 and 2, it becomes possible to determine the PMIs of other cells and inter-cell phase difference information with high accuracy (make more optimal selections).

<Measurement of Single-Cell CQI>

Next, the CQI (single-cell CQI) of the serving cell is measured from the following equation 3 using the PMI of the serving cell acquired from the equations 7 (step ST 302).

[Formula 10]

$$\gamma_{SC}^l = f(\hat{P}_1, \hat{H}_1) = P_T/L \cdot \|r^l \cdot H_1 \hat{P}_1\|^2/(N+ICI) \quad \text{(Equation 3)}$$

where
$H_1$: the channel state of the serving cell
$P_T$: transmission power from the radio base station apparatus
L: rank
r: received signal
l: layer index
N: average noise of the receiver in the mobile terminal apparatus
ICI: interference from cells other than the serving cell against the mobile terminal apparatus <Measurement of CoMP CQI>

Also, the CQI (CoMP CQI) of a plurality of cells is calculated from the following equation 4, using the PMI of each cell and inter-cell phase difference information given from the equations 7 (step ST 303).

[Formula 11]

$$\gamma_{JP}^l = g(\hat{P}_k, \hat{W}_k, H) = KP_T/L \cdot \|r^l \cdot HP\|^2/(N+ICI') \quad \text{(Equation 4)}$$

where
K: the number of cells included in CoMP transmission
$P_T$: transmission power from radio base station apparatus
L: rank
r: received signal
H: channel state of a plurality of cells, H=[$H_1, H_2, \ldots, H_K$]
N: average noise of receiver in mobile terminal apparatus
ICI': interference from cells not belonging to CoMP set, in mobile terminal apparatus Here, presuming CoMP transmission/reception, the PMI of each cell and inter-cell phase difference information are determined, using the above equations 7, from the channel states of a plurality of cells, and, based on the PMI of each cell and inter-cell phase difference information, the CQI (CoMP CQI) of a plurality of cells is measured. Consequently, it is possible to determine the CoMP CQI with high accuracy.

Also, although, according to the first mode, the PMI of the serving cell that is quantized from the channel state of the serving cell is used in the calculation of the CoMP CQI, according to a second mode, the PMI of the serving cell is determined from the channel states of a plurality of cells. Consequently, with the second mode, it is possible to determine the CoMP CQI with high accuracy, compared to the first mode. Also, with the second mode, it is possible to omit the step of determining the PMI of the serving cell from the channel state of the serving cell and sending feedback to the radio base station apparatus.

(Third Mode)

Figure 7:
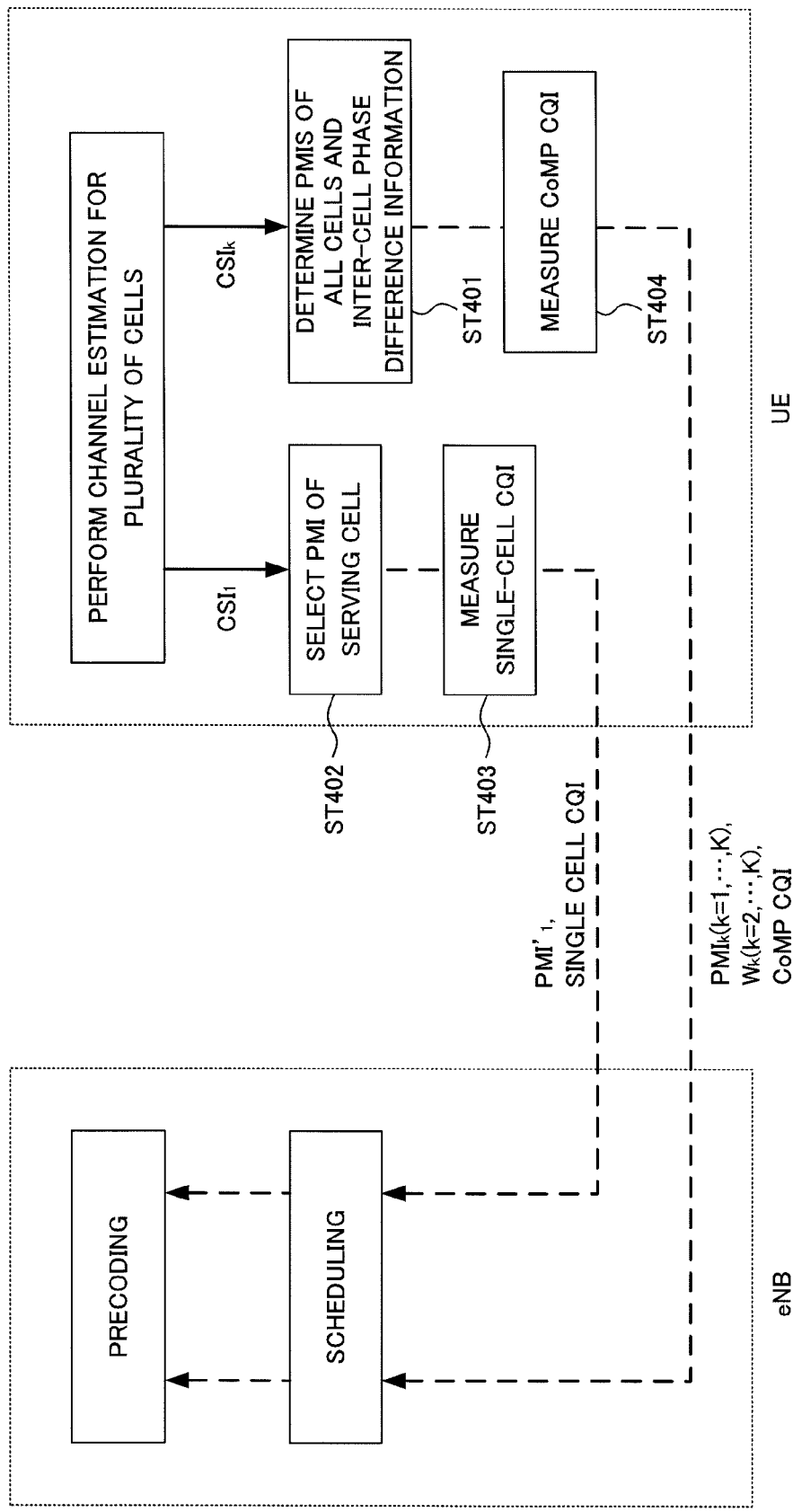
FIG. 7 is a diagram to explain a method of determining PMI, inter-cell phase difference information and CQI according to a third mode.

According to a third mode, a mobile terminal apparatus UE executes calculations from the channel states of a plurality of cells, such that the combinations of the PMI of each cell and inter-cell phase difference information become optimal with respect to all cells included in CoMP transmission including the serving cell, like the above second mode. Furthermore, with the third mode, the PMI of the serving cell is determined using a codebook from the channel state of the serving cell, and the PMI of the serving cell is applied to the measurement of the single-cell CQI. To be more specific, the mobile terminal apparatus UE is able to determine various pieces of information using the following equation (see FIG. 7).

<Determining the PMI of all Cells and Inter-Cell Phase Difference Information W>

First, the mobile terminal apparatus UE estimates downlink channel state using reference signals included in downlink signals from a plurality of cells. Then, mobile terminal apparatus UE determines the PMIs of all cells including the serving cell and inter-cell phase difference information from the channel states of a plurality of cells using the following equations 7, like the above second mode (step ST 401).

[Formula 12]

$$\{\hat{P}_1, \hat{P}_2, \ldots, \hat{P}_K, \hat{W}_2, \ldots, \hat{W}_K\} = \quad \text{(Equation 7)}$$
$$\underset{1 \le i_2, \ldots, i_K \le 2^M, 1 \le j_1, \ldots, j_K \le 2^N}{\operatorname{argmax}} \|H \cdot P\|^2$$
$$P = [P_{j_1}^H, W_{i_2} P_{j_2}^H, \ldots, W_{i_K} P_{j_K}^H]^H$$

where
K: the number of cells included in CoMP transmission
i: codeword index in inter-cell phase difference information
M: codebook size (bits) in inter-cell phase difference information
j: codebook index in PMI codebook
N: codebook size of PMI
H: the channel states of a plurality of cells, H=[$H_1, H_2, \ldots, H_K$]

<Selection of the PMI of the Serving Cell>

Also, the mobile terminal apparatus UE selects the $PMI_1$ of the serving cell from the following equation 8, using the channel state of the serving cell ($CSI_1$) (step ST 402). In this case, the mobile terminal apparatus UE selects the optimal $PMI_1$ using a codebook in which a plurality of PMIs are defined on a per rank basis. By this means, the $PMI_1$ of the serving cell is quantized.

[Formula 13]

$$\hat{P}_1' = \underset{1 \le j_1 \le 2^N}{\operatorname{argmax}} \|H_1 \cdot P_{j_1}\|^2 \quad \text{(Equation 8)}$$

where
j: codebook index in PMI codebook
N: codebook size of PMI
$H_1$: the channel state of the serving cell
$P_{j_1}$: codeword index in the serving cell <Measurement of Single-Cell CQI>

Next, using the PMI of the serving cell acquired from the equation 8, the CQI (single-cell CQI) of the serving cell is measured from the equation 9 (step ST 403).

[Formula 14]

$$\gamma_{JP}^l = f(\hat{P}_1, H_1) = P_T/L \cdot \|r^l \cdot H_1 \hat{P}_1\|^2 / (N + ICI) \quad \text{(Equation 9)}$$

where
- $H_1$: the channel state of the serving cell
- $P_T$: transmission power from the radio base station apparatus
- L: rank
- r: received signal
- l: layer index
- N: average noise of the receiver in the mobile terminal apparatus
- ICI: interference from cells other than the serving cell against the mobile terminal apparatus According to the third mode, upon measurement of the single-cell CQI, the PMI of the serving cell, determined from the channel state of the serving cell, is applied. Consequently, compared to the second mode, it is possible to improve the accuracy of the measurement of the single-cell CQI.

<Measurement of CoMP CQI>

Also, the CQI (CoMP CQI) of a plurality of cells is measured from the following equation 4, using the PMI of each cell and inter-cell phase difference information given from the equations 7 (step ST 404).

[Formula 15]

$$\gamma_{JP}^l = g(\hat{P}_k, \hat{W}_k, H) = KP_T/L \cdot \|r^l \cdot HP\|^2 / (N + ICI') \quad \text{(Equation 4)}$$

where
- K: the number of cells included in CoMP transmission
- $P_T$: transmission power from the radio base station apparatus
- L: rank
- r: received signal
- H: the channel states of a plurality of cells, $H = [H_1, H_2, \ldots, H_K]$
- N: average noise of the receiver in the mobile terminal apparatus
- ICI': interference from cells not belonging to the CoMP set, in the mobile terminal apparatus According to the third mode, like the second mode, the PMI corresponding to each cell and inter-cell phase difference information are determined from the channel states of a plurality of cells using the above equations 7, and the CQI (CoMP CQI) of a plurality of cells is measured based on the PMI of each cell and inter-cell phase difference information. Consequently, it becomes possible to find the CoMP CQI with high accuracy.

Example

Next, an example of an evaluation result of determining the PMI of each cell, inter-cell phase difference information and channel quality information (single-cell CQI and CoMP CQI) using the above-described first mode to the third mode in a mobile terminal apparatus UE will be described.

Here, presuming two-cell CoMP transmission, the number of antennas of the radio base station apparatus eNB of each cell is assumed to be two, and the number of antennas of a mobile terminal apparatus UE is assumed to be one. Also, as a codebook for selecting the PMI of each cell, a codebook (two bits) for two transmitting antennas of the Rel-8 LTE system is used. Also, the inter-cell phase difference information is assumed to be phase difference information formed with two bits (1, −1, j, and −j). Also, the downlink channel state H estimated by the mobile terminal apparatus UE is set as follows.

$$H = [0.7 + 0.1j, 0.4 + 0.5j, 0.5 + 0.6j, 0.6jj], \sigma^2_{ICI' + N_0} = 0.3162 \quad \text{[Formula 16]}$$

Based on the above conditions, the PMIs, inter-cell phase difference information and CQIs are determined by applying the above-described first mode to third mode. The results are shown in Table 1. Note that, as a reference example, results of determining the PMIs and inter-cell phase difference information using the above equation 1 and equations 2 and measuring the CQIs using the above equation 3 and equation 4 are also shown in Table 1.

TABLE 1

|  | PMI1 | PMI2 | W2 | PMI1' | Single-Cell SINR | CoMP SINR |
|---|---|---|---|---|---|---|
| Reference Example | 1 | 1 | 1 | — | 1.96 | 36.68 |
| First Mode | 1 | 4 | 1 | — | 1.96 | 39.72 |
| Second Mode | 4 | 1 | 4 | — | 1.91 | 40.48 |
| Third Mode | 4 | 1 | 4 | 1 | 1.96 | 40.48 |

From the results of Table 1, different PMIs and inter-cell phase difference information are selected between the reference example, and the first mode to the third mode. Also, compared to the reference example, it is possible to optimize the CoMP SINR using the first mode to the third mode. In particular, upon calculation of the CoMP CQI, with respect to the PMI of the serving cell, it is possible to determine the CoMP SINR with high accuracy, according to the second mode and third mode to apply the PMI determined from the channel states of a plurality of cells.

Figure 8:
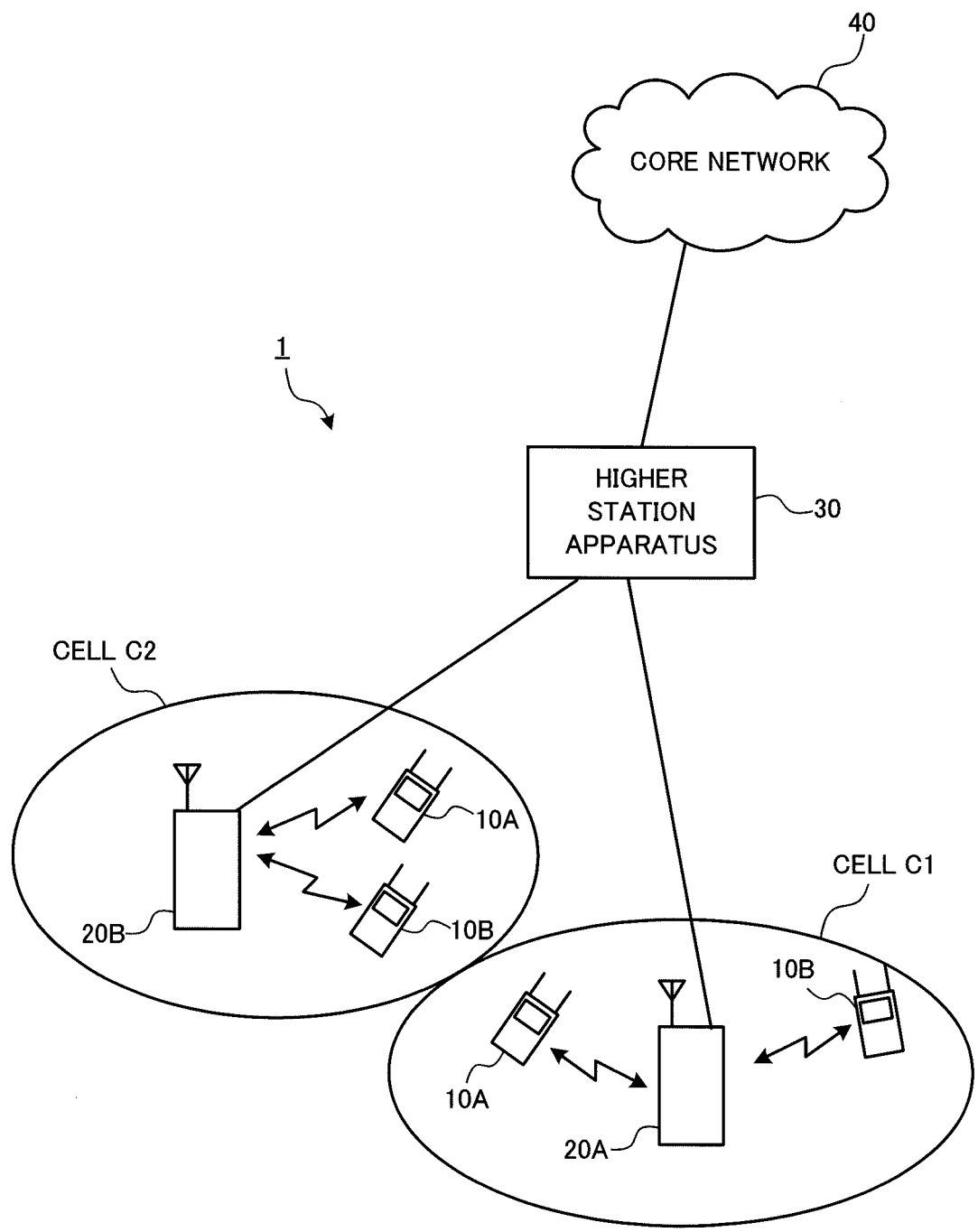
FIG. 8 is a diagram to explain a system configuration of a radio communication system.

A radio communication system according to an embodiment of the present invention will be described below in detail. FIG. 8 is a diagram to explain a system configuration of a radio communication system according to the present embodiment. Note that the radio communication system shown in FIG. 1 is a system to accommodate, for example, the LTE system or SUPER 3G. This radio communication system uses carrier aggregation, which makes a plurality of fundamental frequency blocks, in which the system band of the LTE system is one unit, as one. Also, this radio communication system may be referred to as IMT-Advanced or may be referred to as 4G.

As shown in FIG. 8, a radio communication system 1 is configured to include radio base station apparatuses 20A and 20B, a plurality of the first and second mobile terminal apparatuses 10A and 10B that communicate with the radio base station apparatuses 20A and 20B. The radio base station apparatuses 20A and 20B are connected with a higher station apparatus 30, and this higher station apparatus 30 is connected with a core network 40. Also, the radio base station apparatuses 20A and 20B are connected with each other by wire connection or by wireless connection. The first and second mobile terminal apparatuses 10A and 10B are able to communicate with the radio base station apparatuses 20A and 20B in cells C1 and C2. Note that the higher station apparatus 30 includes, for example, an access gateway apparatus, a radio network controller (RNC), a mobility management entity (MME) and so on, but is by no means limited to these.

Although the first and second mobile terminal apparatuses 10A and 10B may be either LTE terminals or LTE-A terminals, the following description will be given simply with respect to the first and second mobile terminal apparatuses unless specified otherwise. Also, although the mobile terminal apparatuses 10A and 10B will be described to perform radio communication with the base station apparatuses 20A and 20B, for ease of explanation, more generally, user apparatuses (UE: User Equipment) including mobile terminal apparatuses and fixed terminal apparatuses may be used as well.

In the radio communication system 1, as radio access schemes, OFDMA (Orthogonal Frequency Division Multiple Access) is adopted on the downlink, and SC-FDMA (Single-Carrier Frequency Division Multiple Access) is adopted on the uplink. But the uplink radio access scheme is by no means limited to this. OFDMA is a multi-carrier transmission scheme to perform communication by dividing a frequency band into a plurality of narrow frequency bands (subcarriers) and mapping data to each subcarrier. SC-FDMA is a single carrier transmission scheme to reduce interference between terminals by dividing, per terminal, the system band into bands formed with one or continuous resource blocks, and allowing a plurality of terminals to use mutually different bands.

The downlink communication channels include a PDSCH (Physical Downlink Shared Channel), which is a downlink data channel that is used by the first and second mobile terminal apparatuses 10A and 10B on a shared basis, and downlink L1/L2 control channels (PDCCH, PCFICH, PHICH). Transmission data and higher control information are transmitted by the PDSCH. Scheduling information for the PDSCH and the PUSCH is transmitted by the PDCCH (Physical Downlink Control Channel). The number of OFDM symbols to be used for the PDCCH is transmitted by the PCFICH (Physical Control Format Indicator Channel). HARQ ACK/NACK in response to the PUSCH are transmitted by the PHICH (Physical Hybrid-ARQ Indicator Channel).

The uplink communication channels include a PUSCH (Physical Uplink Shared Channel), which is an uplink data channel used by each mobile terminal apparatus on a shared basis, and a PUCCH (Physical Uplink Control Channel), which is an uplink control channel. By means of this PUSCH, transmission data and higher control information are transmitted. Also, downlink channel quality information (CQI), ACK/NACK and so on are transmitted by the PUCCH.

Figure 9:
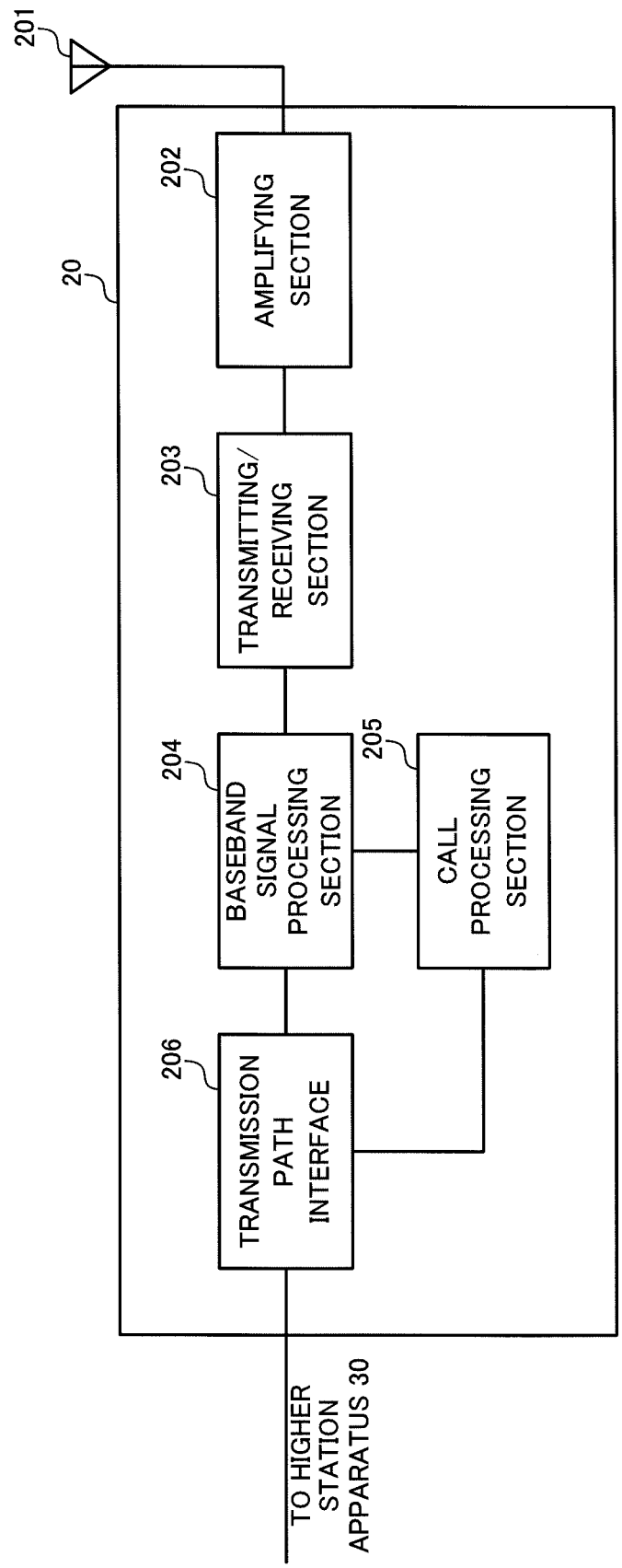
FIG. 9 is a diagram to explain an overall configuration of a radio base station apparatus.

Referring to FIG. 9, an overall configuration of a radio base station apparatus according to the present embodiment will be explained. Note that the radio base station apparatuses 20A and 20B have the same configuration and therefore will be described as "radio base station apparatus 20." Also, the first and second mobile terminal apparatuses 10A and 10B have the same configuration and therefore will be described as "mobile terminal apparatus 10." The radio base station apparatus 20 has a transmitting/receiving antenna 201, an amplifying section 202, transmitting/receiving section (reporting section) 203, a baseband signal processing section 204, a call processing section 205, and a transmission path interface 206. Transmission data to be transmitted from the radio base station apparatus 20 to a mobile terminal apparatus on the downlink is input from the higher station apparatus 30, into the baseband signal processing section 204, via the transmission path interface 206.

In the baseband signal processing section 204, a downlink data channel signal is subject to, for example, a PDCP layer process, division and coupling of transmission data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process, and a precoding process. Furthermore, as for the signal of the physical downlink control channel, which is a downlink control channel, transmission processes such as channel coding and an inverse fast Fourier transform are performed.

The baseband signal processing section 204 furthermore reports control information for allowing each mobile terminal apparatus 10 to communicate with the radio base station apparatus, to the mobile terminal apparatuses 10 connected to the same cell, by a broadcast channel. The broadcast information for communication in the cell includes, for example, the uplink or downlink system bandwidth, identification information of a root sequence (root sequence index) for generating random access preamble signals in the PRACH, and so on.

The baseband signal output from the baseband signal processing section 204 is converted into a radio frequency band in the transmitting/receiving section 203. The amplifying section 202 amplifies the radio frequency signal subjected to frequency conversion, and outputs the result to the transmitting/receiving antenna 201. Note that the transmitting/receiving section 203 has a receiving means to receive uplink signals including information about phase differences between a plurality of cells and PMIs, and a transmission means to perform coordinated multiple-point transmission of transmission signals.

As for a signal to be transmitted from the mobile terminal apparatus 10 to the radio base station apparatus 20 on the uplink, the radio frequency signal received in the transmitting/receiving antenna 201 is amplified in the amplifying section 102, converted into a baseband signal by frequency conversion in the transmitting/receiving section 203, and input in the baseband signal processing section 204.

The baseband signal processing section 204 applies, to the transmission data included in the baseband signal received on the uplink, an FFT process, an IDFT process, error correction decoding, a MAC retransmission control receiving process, and RLC layer and PDCP layer receiving processes. The decoded signal is transferred to the higher station apparatus 30 via the transmission path interface 206.

The call processing section 205 performs call processing such as setting up and releasing communication channels, manages the state of the radio base station apparatus 20 and manages the radio resources.

Figure 10:
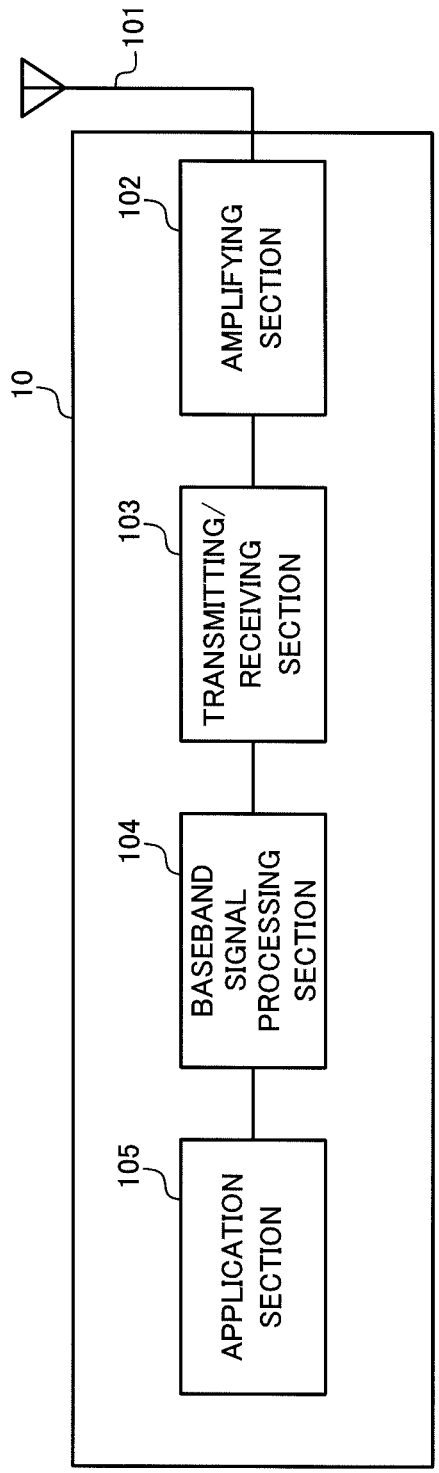
FIG. 10 is a diagram to explain an overall configuration of a mobile terminal apparatus.

Next, referring to FIG. 10, an overall configuration of a mobile terminal apparatus according to the present embodiment will be described. An LTE terminal and an LTE-A terminal have the same hardware configurations in the principle parts, and therefore will be described indiscriminately. The mobile terminal apparatus 10 has a transmitting/receiving antenna 101, an amplifying section 102, a transmitting/receiving section (receiving section) 103, a baseband signal processing section 104, and an application section 105.

As for downlink data, a radio frequency signal received in the transmitting/receiving antenna 101 is amplified in the amplifying section 102, and subjected to frequency conversion and converted into a baseband signal in the transmitting/receiving section 103. This baseband signal is subjected to receiving processes such as an FFT process, error correction decoding and retransmission control, in the baseband signal processing section 104. In this downlink data, downlink transmission data is transferred to the application section 105. The application section 105 performs processes related to higher layers above the physical layer and the MAC layer. Also, in the downlink data, broadcast information is also transferred to the application section 105.

Uplink transmission data is input from the application section 105 to the baseband signal processing section 104. The baseband signal processing section 104 performs a mapping process, a retransmission control (HARQ) transmission process, channel coding, a DFT process, and an IFFT process. The baseband signal output from the baseband signal processing section 104 is converted into a radio frequency band in the transmitting/receiving section 103. After this, the radio frequency signal having been subjected to frequency conversion is amplified in the amplifying section 102 and transmitted from the transmitting/receiving antenna 101. Note that the transmitting/receiving section 103 constitutes a transmitting means to transmit information about phase differences, information about the connecting cell, the selected PMIs and so on, to the radio base station apparatus eNBs of a plurality of cells, and a receiving means to receive downlink signals.

Figure 11:
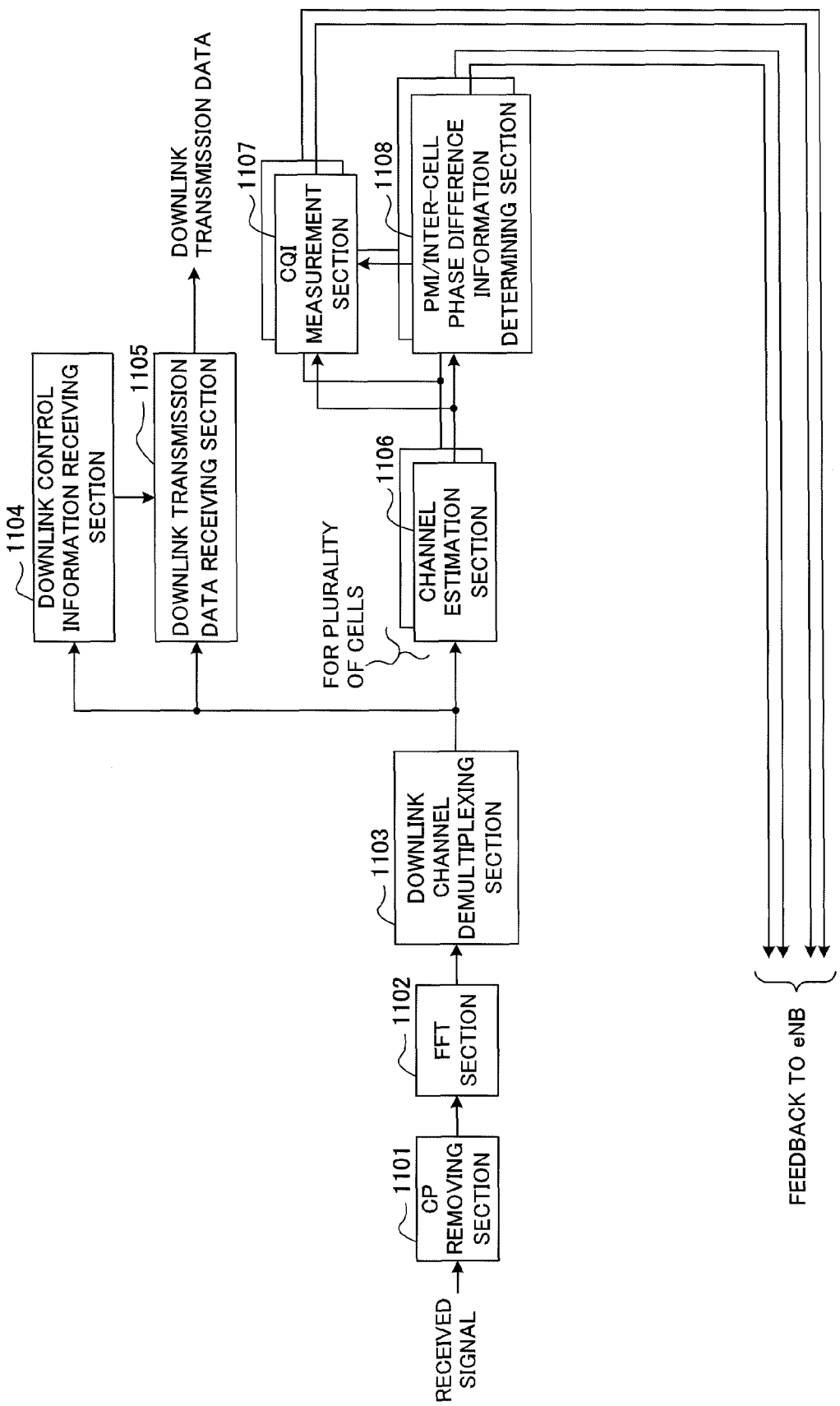
FIG. 11 is a functional block diagram corresponding to a baseband signal processing section of a mobile terminal apparatus.

The function blocks of a mobile terminal apparatus will be described with reference to FIG. 11. Note that the function blocks of FIG. 11 are primarily the processing content of the baseband processing section. Also, the function blocks shown in FIG. 11 are simplified to explain the present invention, and assumed to have the configurations which a baseband processing section normally has.

The receiving section of a mobile terminal apparatus UE has a CP removing section 1101, an FFT section 1102, a downlink channel demultiplexing section 1103, a downlink control information receiving section 1104, a downlink transmission data receiving section 1105, a channel estimation section 1106, a CQI measurement section 1107, and a PMI/inter-cell phase difference information determining section 1108.

A transmission signal that is transmitted from the radio base station apparatus eNB is received by an antenna and is output to the CP removing section 1101. The CP removing section 1101 removes the CPs from the received signal and outputs the signal to the FFT (Fast Fourier Transform) 1102. The FFT section 1102 performs a Fourier transform of the signal from which the CPs have been removed, and converts this signal from a time sequence signal to a frequency domain signal. The FFT section 1102 outputs the signal having been converted into a frequency domain signal, to the downlink channel demultiplexing section 1103. The downlink channel demultiplexing section 1103 separates the downlink channel signal into downlink control information, downlink transmission data, and a downlink reference signal. The downlink channel demultiplexing section 1103 outputs the downlink control information to the downlink control information receiving section 1104, the downlink transmission data to the downlink transmission data receiving section 1105, and the downlink reference signal to the channel estimation section 1106.

The downlink control information receiving section 1104 demodulates the downlink control information and outputs the demodulated control information to the downlink transmission data receiving section 1105. The downlink transmission data receiving section 1105 demodulates the downlink transmission data using control information.

The channel estimation section 1106 estimates the channel state using the reference signal included in the downlink signal, and outputs the estimated channel state to the CQI measurement section 1107 and the PMI/inter-cell phase difference information determining section 1108. When reference signals are transmitted from a plurality of cells, downlink channel states are estimated using the reference signals included in downlink signals from the plurality of cells.

The PMI/inter-cell phase difference information determining section 1108 calculates optimal values of the combinations of the PMI of each cell and inter-cell phase difference information, from the channel states of a plurality of cells, and determines the PMI of each cell and inter-cell phase difference information. The determined PMI and inter-cell phase difference information are output to the CQI measurement section 1107 and reported to the radio base station apparatus eNB as feedback information.

To be more specific, the PMI/inter-cell phase difference information determining section 1108 is able to determine the PMI of each cell and inter-cell phase difference information, from the channel state determined in the channel estimation section 1106, using the above-described equations 5 to 8.

For example, according to the first mode, the PMI/inter-cell phase difference information determining section 1108 selects the $PMI_1$ of the serving cell from the channel state of the serving cell ($CSI_1$) using the above equation 5. Then, using the above equations 6, the PMIs of other cells and inter-cell phase difference information are determined from the $PMI_1$ of the serving cell determined from the equation 5 and the channel states of a plurality of cells. By this means, compared to the PMIs of other cells and inter-cell phase difference information determined by the above equations 1 and 2, it is possible to determine the PMIs of other cells and inter-cell phase difference information with high accuracy (make more optimal selections).

According to the second mode, the PMI/inter-cell phase difference information determining section 1108 determines the PMI of each cell and inter-cell phase difference information from the above equations 7. According to the third mode, the PMI/inter-cell phase difference information determining section 1108 determines the PMI of each cell and inter-cell phase difference information from the above equations 7, and selects the $PMI_1$ of the serving cell using the channel state of the serving cell from the above equation 8.

The CQI measurement section 1107 measures the CQI using the channel state reported from the channel estimation section 1106, and the PMI of each cell and inter-cell phase difference information reported from the PMI/inter-cell phase difference information determining section 1108. As the CQI, in addition to the CQI (single-cell CQI) of the serving cell, the CQI (CoMP CQI) of a plurality of cells that perform CoMP transmission/reception is also measured. The measured CQI is reported to the radio base station apparatus eNB as feedback information.

The CQI measurement section 1107 is able to determine the PMI of each cell and inter-cell phase difference information, from the information reported from the channel estimation section 1106 and the PMI/inter-cell phase difference information determining section 1108, using the above-described equations 3, 4, and 9.

For example, according to the first mode and second mode, the CQI measurement section 1107 measures the CQI (single-cell CQI) of the serving cell using the above equation 3, and measures the CQI (CoMP CQI) of a plurality of cells using the above equation 4. Also, according to the third mode, the CQI measurement section 1107 measures the CQI (single-cell CQI) of the serving cell using the above equation 9, and measures the CQI (CoMP CQI) of a plurality of cells using the above equation 4. In this way, presuming CoMP transmission/reception, by determining the PMI of each cell and inter-cell phase difference information from the channel states of a plurality of cells and measuring the CQI (CoMP CQI) of a plurality of cells based on the PMI of each cell and inter-cell phase difference information, it becomes possible to determine the CoMP CQI with high accuracy.

Next, the functional configuration of the radio base station apparatus will be described with reference to FIG. 12. The radio base station apparatus shown in FIG. 12 has a centralized control-type radio base station configuration. In the event of centralized control, a given radio base station apparatus eNB (centralized radio base station apparatus eNB, in cell #1 in FIG. 12) performs radio resource allocation control such as scheduling, and the cell under control (cell #2 in FIG. 12) follows the radio resource allocation result by the centralized radio base station apparatus eNB. In this case, the phase difference information that is fed back is used as information that is necessary for executing radio resource allocation between a plurality of cells, in a user scheduling control section of the centralized radio base station apparatus eNB.

Figure 12:
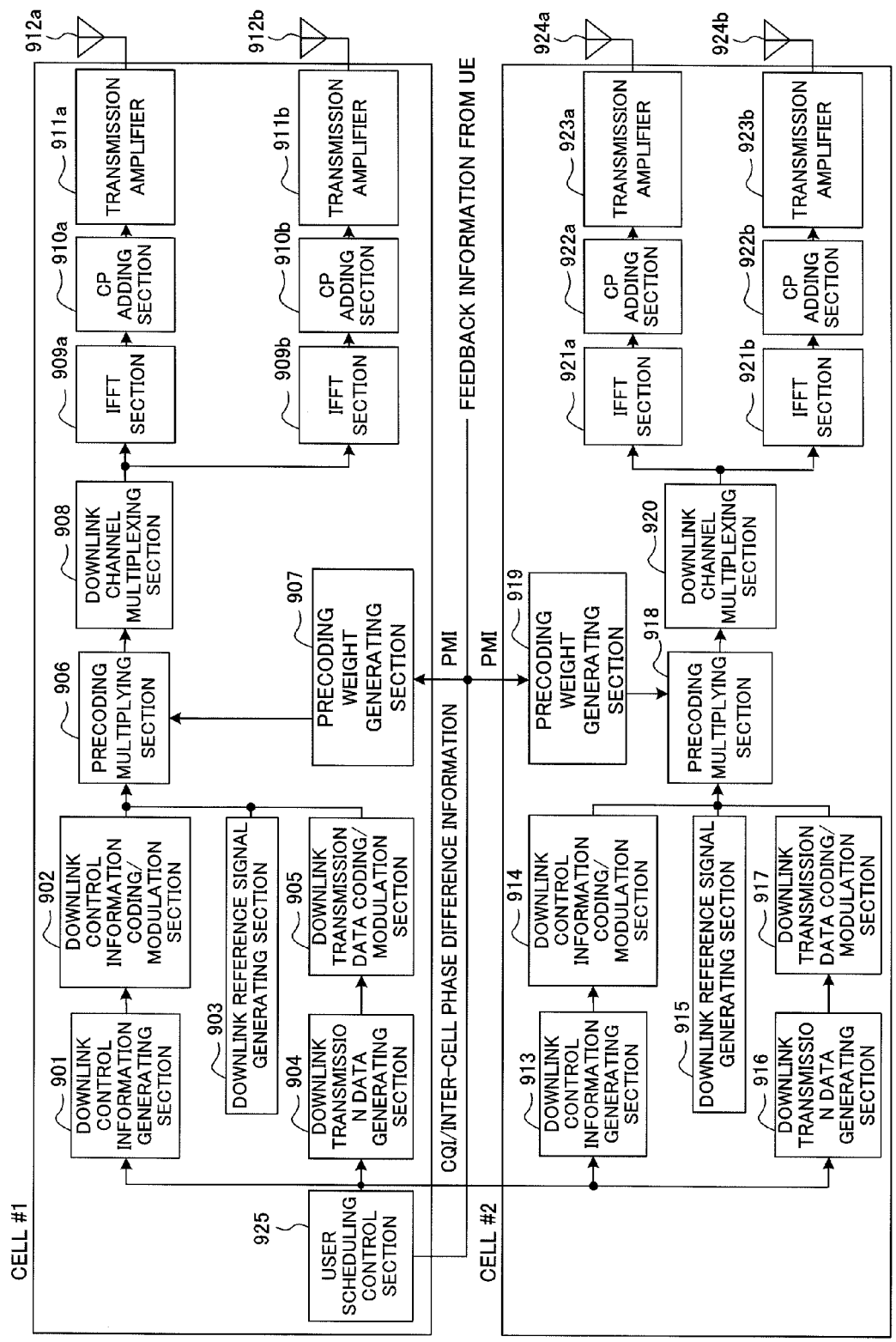
FIG. 12 is a functional block diagram corresponding to a baseband processing section of a centralized control-type radio base station apparatus.

Note that the function blocks of FIG. 12 are primarily the processing content of the baseband processing section. Also, the functional block diagram of FIG. 12 is simplified, and has configurations which a baseband processing section normally has.

The transmission section on the centralized radio base station apparatus eNB (cell #1) side has a downlink control information generating section 901, a downlink control information coding/modulation section 902, a downlink reference signal generating section 903, a downlink transmission data generating section 904, a downlink transmission data coding/modulation section 905, a precoding multiplying section 906, a precoding weight generating section 907, a downlink channel multiplexing section 908, IFFT sections 909a and 909b, CP adding sections 910a and 910b, transmission amplifiers 911a and 911b, transmitting antennas 912a and 912b, and a user scheduling control section 925.

Meanwhile, the transmission section on the side of the radio base station apparatus eNB (cell #2) of the serving cell has a downlink control information generating section 913, a downlink control information coding/modulation 914, a downlink reference signal generating section 915, a downlink transmission data generating section 916, a downlink transmission data coding/modulation section 917, a precoding multiplying section 918, a precoding weight generating section 919, a downlink channel multiplexing section 920, IFFT sections 921a and 921b, CP adding sections 922a and 922b, transmission amplifiers 923a and 923b, and transmitting antennas 924a and 924b. The centralized radio base station apparatus eNB and the radio base station apparatus eNB of the serving cell are connected by optical fiber.

The downlink control information generating sections 901 and 913 generate downlink control information and outputs that downlink control information to the downlink control information coding/modulation sections 902 and 914. The downlink control information coding/modulation sections 902 and 914 perform channel coding and data modulation of the downlink control information, and output the result to the precoding multiplying sections 906 and 918.

The downlink reference signal generating sections 903 and 915 generate downlink reference signals (CRS (Common Reference Signal), CSI-RS (Channel Information State-Reference Signal) and DM-RS (Demodulation-Reference Signal)), and output these downlink reference signals to the precoding multiplying sections 906 and 918.

The downlink transmission data generating sections 904 and 916 generate downlink transmission data and output that downlink transmission data to the downlink transmission data coding/modulation sections 905 and 917. The downlink transmission data coding/modulation sections 905 and 917 perform channel coding and data modulation for the downlink transmission data, and output the result to the precoding multiplying sections 906 and 918.

The downlink control information generating sections 901 and 913 generate downlink control information by control by the user scheduling control section 925. At this time, the user scheduling control section 925 performs scheduling control of the downlink control information using the CQI and inter-cell phase difference information from the mobile terminal apparatus UE. That is, the user scheduling control section 925 adjusts the phase differences between cells using the inter-cell phase difference information, and performs scheduling control for the downlink control information such that CoMP transmission is possible in cell #1 and cell #2 (that is, to allow CoMP transmission with radio base station apparatus eNBs of other cells).

As described above, the downlink transmission data generating sections 904 and 916 each generate downlink transmission data by control by the user scheduling control section 925. At this time, the user scheduling control section 925 performs scheduling control of the downlink transmission data using the CQI and inter-cell phase difference information from the mobile terminal apparatus UE. That is, the user scheduling control section 925 adjusts the phase differences between cells using the inter-cell phase difference information, and performs scheduling control for the downlink transmission data such that CoMP transmission is possible in cell #1 and cell #2 (that is, to allow CoMP transmission with the radio base station apparatus eNBs of other cells).

In this way, the user scheduling control section 925 plays the role of a phase difference adjusting means to adjust the phase differences between cells using inter-cell phase difference information. By adjusting the phase differences between cells, even when a MIMO technique is applied, it is still possible to optimize the effect of joint transmission-type CoMP transmission.

The precoding weight generating sections 907 and 919 generate precoding weights, using a codebook, based on the PMI fed back from the mobile terminal apparatus UE. The precoding weight generating sections 907 and 919 output the precoding weights to the precoding multiplying sections 906 and 918.

The precoding weight generating sections 907 and 919 each have a codebook and select a precoding weight corresponding to the PMI from the codebook. Here, when the total number of antennas of the radio base station apparatus eNBs of a plurality of cells is greater than the number of antennas supported by the codebooks, codebooks to support a greater number of antennas than the number of antennas supported by the codebooks may be used. For example, when two radio base station apparatus eNBs both have two transmitting antennas, PMIs for four transmitting antennas are fed back.

The precoding multiplying sections 906 and 918 multiply transmission signals by precoding weights corresponding to the PMIs. That is, the precoding multiplying sections 906 and 918 apply a phase shift and/or an amplitude shift to the transmission signals (downlink control information, downlink reference signal and downlink transmission data), for each of the transmitting antennas 912a and 912b and the transmitting antennas 924a and 924b, based on the precoding weights given from the precoding weight generating sections 907 and 919 (weighting of transmitting antennas by precoding). The precoding multiplying sections 906 and 918 output the transmission signals having been subjected to a phase shift and/or an amplitude shift, to the downlink channel multiplexing sections 908 and 920.

The downlink channel multiplexing sections 908 and 920 combine the downlink control information having been subjected to a phase shift and/or an amplitude shift, the downlink reference signals, and the downlink transmission data, and generate transmission signals for each of the transmitting antennas 912a and 912b and transmitting antennas 924a and 924b. The downlink channel multiplexing sections 908 and 920 output the transmission signals to the IFFT (Inverse Fast Fourier Transform) sections 909a and 909b and the IFFT sections 921a and 921b.

The IFFT sections 909*a* and 909*b* and the IFFT sections 921*a* and 921*b* perform an IFFT of the transmission signals, and outputs the transmission signals after the IFFT to the CP adding sections 910*a* and 910*b* and the CP adding sections 922*a* and 922*b*. The CP adding sections 910*a* and 910*b* and the CP adding sections 922*a* and 922*b* add CPs (cyclic prefixes) to the transmission signals after the IFFT and output the transmission signals to which CPs have been added to the transmission amplifiers 911*a* and 911*b* and the transmission amplifiers 923*a* and 923*b*.

The transmission amplifiers 911*a* and 911*b* and the transmission amplifiers 923*a* and 923*b* amplify the transmission signals to which CPs have been added. The amplified transmission signals are transmitted from the transmitting antennas 912*a* and 912*b* and the transmitting antennas 924*a* and 924*b*, to the mobile terminal apparatus UE, through the downlink.

Next, the function blocks of a radio base station apparatus will be described with reference to FIG. 13. The radio base station apparatus shown in FIG. 13 has an autonomous distributed control-type radio base station configuration. In the event of autonomous distributed control, radio resource allocation control such as scheduling is performed in each of a plurality of radio base station apparatus eNBs (or RREs). In this case, phase difference information that is fed back is used as information that is necessary to perform radio resource allocation, in the user scheduling control sections of the plurality of radio base station apparatus eNBs.

Figure 13:
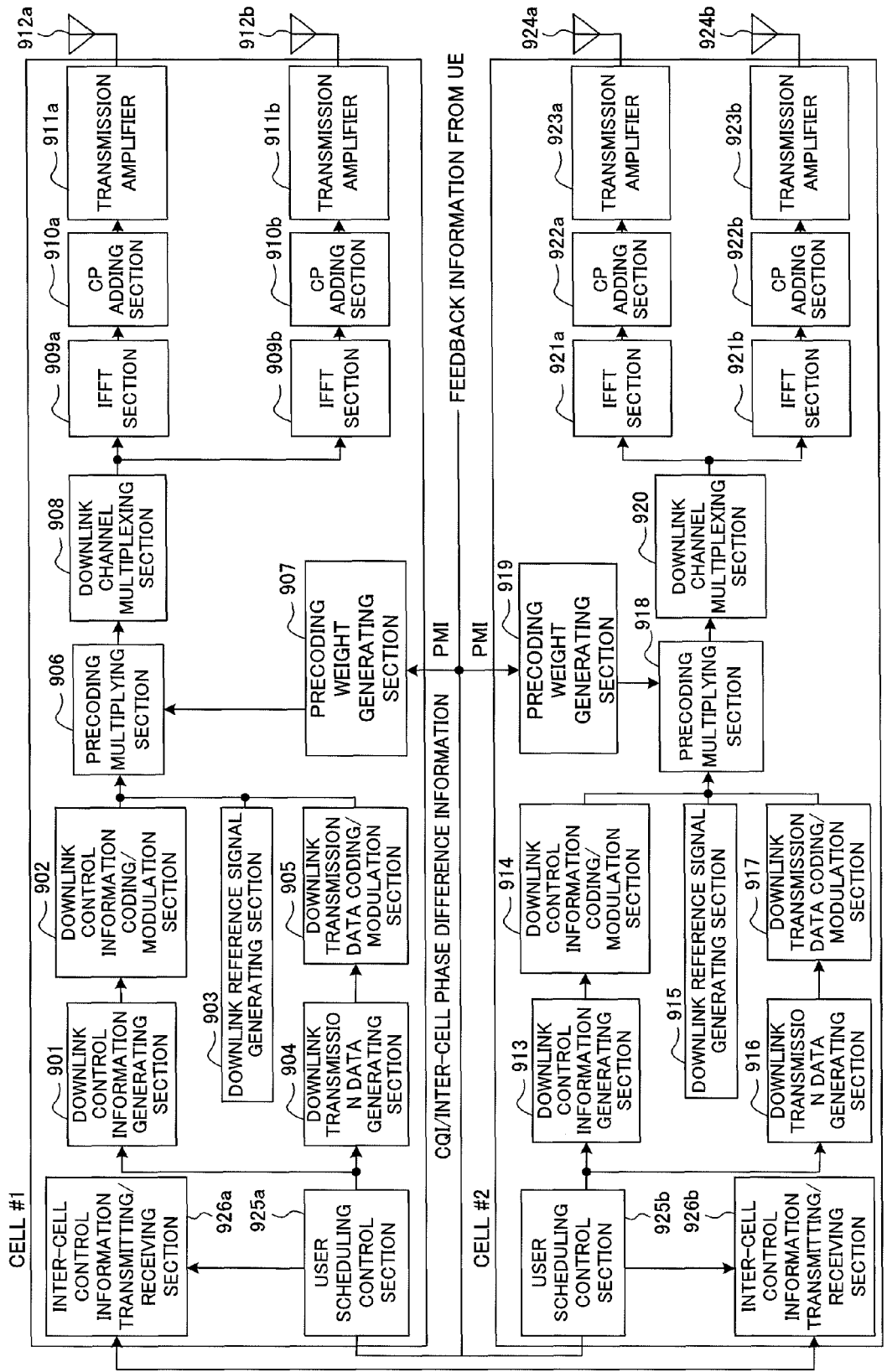
FIG. 13 is a functional block diagram corresponding to a baseband processing section of an autonomous distributed control-type radio base station apparatus.

Note that the function blocks of FIG. 13 are primarily the processing content of the baseband processing section. Also, the functional block diagram of FIG. 13 is simplified, and has configurations which a baseband processing section normally has. Processing sections in FIG. 13 that are the same as in FIG. 12 will be assigned the same codes as in FIG. 12 and their detailed descriptions will be omitted.

The transmission section on the side of cell #1 has a downlink control information generating section 901, a downlink control information coding/modulation 902, a downlink reference signal generating section 903, a downlink transmission data generating section 904, a downlink transmission data coding/modulation section 905, a precoding multiplying section 906, a precoding weight generating section 907, a downlink channel multiplexing section 908, IFFT sections 909*a* and 909*b*, CP adding sections 910*a* and 910*b*, transmission amplifiers 911*a* and 911*b*, transmitting antennas 912*a* and 912*b*, a user scheduling control section 925*a*, and an inter-cell control information transmitting/receiving section 926*a*.

The transmission section on the side of cell #2 has a downlink control information generating section 913, a downlink control information coding/modulation 914, a downlink reference signal generating section 915, a downlink transmission data generating section 916, a downlink transmission data coding/modulation section 917, a precoding multiplying section 918, a precoding weight generating section 919, a downlink channel multiplexing section 920, IFFT sections 921*a* and 921*b*, CP adding sections 922*a* and 922*b*, transmission amplifiers 923*a* and 923*b*, transmitting antennas 924*a* and 924*b*, a user scheduling control section 925*b*, and an inter-cell control information transmitting/receiving section 926*b*.

The inter-cell control information transmitting/receiving sections 926*a* and 926*b* are connected by an X2 interface. By such connection, it is possible to transmit and receive inter-cell control information, so that a plurality of cells can be coordinated. The control information to be transmitted and received by the X2 interface may include timing information, radio resource allocation information such as scheduling, and so on.

The downlink control information generating sections 901 and 913 generate downlink control information by control of the user scheduling control sections 925*a* and 925*b*. At this time, the user scheduling control sections 925*a* and 925*b* perform scheduling control of the downlink control information using the CQI and inter-cell phase difference information from the mobile terminal apparatus UE. That is, the user scheduling control sections 925*a* and 925*b* adjust the phase differences between cells using the inter-cell phase difference information, and perform scheduling control for the downlink control information such that CoMP transmission is possible in cell #1 and cell #2 (that is, to allow CoMP transmission with the radio base station apparatus eNB of cell #2).

As described above, the downlink transmission data generating sections 904 and 916 each generate downlink transmission data by control by the user scheduling control sections 925*a* and 925*b*. At this time, the user scheduling control sections 925*a* and 925*b* perform scheduling control of the downlink transmission data using the CQI and inter-cell phase difference information from the mobile terminal apparatus UE. That is, the user scheduling control sections 925*a* and 925*b* adjust the phase differences between cells using the inter-cell phase difference information, and perform scheduling control for the downlink transmission data such that CoMP transmission is possible in cell #1 and cell #2 (that is, to allow CoMP transmission with the radio base station apparatus eNB of cell #1).

In this way, the user scheduling control sections 925*a* and 925*b* play the role of a phase difference adjusting means to adjust the phase differences between cells using the inter-cell phase difference information. By adjusting the phase differences between cells in this way, even when a MIMO technique is applied, it is possible to optimize the effect of joint transmission-type CoMP transmission.

In the radio communication system of the above configuration, first, the channel estimation section 1106 of the mobile terminal apparatus UE estimates a plurality of channel states using the reference signals included in downlink signals from a plurality of cells. Next, the PMI/inter-cell phase difference information determining section 1108 calculates optimal values of the combinations of the PMI of each cell and inter-cell phase difference information from the channel states estimated in the channel estimation section 1106, and determines the PMI of each cell and inter-cell phase difference information. Next, the CQI measurement section 1107 measures channel quality from the channel state estimated in the channel estimation section 1106, and PMI and inter-cell phase difference information determined in the PMI/inter-cell phase difference information determining section 1108. The mobile terminal apparatus UE feeds back the PMI of each cell and inter-cell phase difference information acquired in the PMI/inter-cell phase difference information determining section 1108 and the CQIs (single-cell CQI and CoMP CQI) acquired in the CQI measurement section 1107, to the radio base station apparatus.

Also, in the radio base station apparatus, uplink signals to include PMIs and inter-cell phase difference information are received. Next, the precoding multiplying sections 906 and 918 multiply transmission signals by precoding weights corresponding to the PMIs. Next, the user scheduling control sections 925, 925*a* and 925*b* adjust the phase differences between cells using the inter-cell phase difference information, and performs scheduling control such that coordinated multiple-point transmission of transmission signals is possible with the radio base station apparatuses of other cells. By this radio communication method, even when a MIMO technique and a CoMP technique are applied together, it is still possible to optimize the effect of both techniques.

Now, although the present invention has been described in detail with reference to the above embodiments, it should be obvious to a person skilled in the art that the present invention is by no means limited to the embodiments described in this specification. The present invention can be implemented with various corrections and in various modifications, without departing from the spirit and scope of the present invention defined by the recitations of the claims. Consequently, the descriptions in this specification are provided only for the purpose of explaining examples, and should by no means be construed to limit the present invention in any way.

The disclosure of Japanese Patent Application No. 2011-091452, filed on Apr. 15, 2011, including the specification, drawings and abstract, is incorporated herein by reference in its entirety.

The invention claimed is:

1. A mobile terminal apparatus with a processor comprising:
   an estimation section that estimates channel states of a plurality of cells using reference signals included in downlink signals from the plurality of cells;
   a determining section that determines a PMI (Precoding Matrix Indicator) of each cell and inter-cell phase difference information, from the channel states of the plurality of cells;
   a measurement section that measures channel quality from the PMIs and inter-cell phase difference information determined in the determining section; and
   a transmission section that transmits the PMI of each cell, the inter-cell phase difference information and information about the channel quality, to a radio base station apparatus,
   wherein the determining section determines the PMI of a serving cell from a channel state of the serving cell, and determines the combinations of the PMIs of other cells than the serving cell and the inter-cell phase difference information from the channel states of the plurality of cells and the PMI of the serving cell, such that throughput or received SINR (Signal to Interference and Noise Ratio) is maximized; and
   wherein the determining section determines the PMI of the serving cell using the following equation 10, and determines the PMIs of the other cells and the inter-cell phase difference information using the following equations 11:

[Formula 1]

$$\hat{P}_1 = \underset{1 \leq j_1 \leq 2^N}{\mathrm{argmax}} \|H_1 \cdot P_{j_1}\|^2 \qquad \text{(Equation 10)}$$

where
   j: a codebook index of the PMI
   N: a codebook size of the PMI (bits)
   $H_1$: the channel state of the serving cell
   $P_{j1}$: a codeword index in the serving cell

[Formula 2]

$$\{\hat{P}_2, \ldots, \hat{P}_K, \hat{W}_2, \ldots, \hat{W}_K\} = \underset{1 \leq i_2, \ldots, i_K \leq 2^M, 1 \leq j_2, \ldots, j_K \leq 2^N}{\mathrm{argmax}} \|H \cdot P\|^2 \qquad \text{(Equation 11)}$$

$$P = [\hat{P}_1^H, W_{i_2} P_{j_2}^H, L, W_{i_K} P_{j_K}^H]^H$$

where
   K: the number of cells included in CoMP transmission
   i: a codeword index in the inter-cell phase difference information
   M: a codebook size in the inter-cell phase difference information (bits)
   j: a codebook index in a PMI codebook
   N: the codebook size of the PMI
   H: the channel states of the plurality of cells, $H=[H_1, H_2, \ldots, H_K]$.

2. The mobile terminal apparatus according to claim 1, wherein the measurement section measures the channel quality of the serving cell from the PMI of the serving cell and the channel state of the serving cell, and measures the channel quality of the plurality of cells from the PMIs of the other cells, the inter-cell phase difference information and the channel states of the plurality of cells.

3. The mobile terminal apparatus according to claim 1, wherein the measurement section determines the channel quality of the serving cell using the following equation 12, and determines the channel quality of the plurality of cells using the following equation 13:

[Formula 3]

$$\gamma^l_{SC} = f(\hat{P}_1, H_1) = P_T/L \cdot \|r^l \cdot H_l \hat{P}_1\|^2/(N+ICI) \qquad \text{(Equation 12)}$$

where
   $H_1$: the channel state of the serving cell
   $P_T$: transmission power from the radio base station apparatus
   L: rank
   r: received signal
   l: layer index
   N: average noise of a receiver in the mobile terminal apparatus
   ICI: interference from cells other than the serving cell against the mobile terminal apparatus

[Formula 4]

$$\gamma^l_{JP} = g(\hat{P}_k, \hat{W}_k, H) = KP_T/L \cdot \|r^l \cdot HP\|^2/(N+ICI') \qquad \text{(Equation 13)}$$

where
   K: the number of cells included in CoMP transmission
   $P_T$: transmission power from the radio base station apparatus
   L: rank
   r: received signal
   H: the channel states of the plurality of cells, $H=[H_1, H_2, \ldots, H_K]$
   N: average noise of the receiver in the mobile terminal apparatus
   ICI': interference from cells not belonging to a CoMP set, in the mobile terminal apparatus.

4. A mobile terminal apparatus with a processor, comprising:
   an estimation section that estimates channel states of a plurality of cells using reference signals included in downlink signals from the plurality of cells;

a determining section that determines the combinations of a PMI (Precoding Matrix Indicator) of each cell and inter-cell phase difference information, from the channel states of the plurality of cells, such that throughput or received SINR (Signal to Interference and Noise Ratio) is maximized;

a measurement section that measures channel quality from the PMIs and the inter-cell phase difference information determined in the determining section; and a transmission section that transmits the PMI of each cell, the inter-cell phase difference information and information about the channel quality, to a radio base station apparatus, wherein the determining section determines the PMIs of the plurality of cells and the inter-cell phase difference information using the following equations 14:

[Formula 5]

$$\{\hat{P}_1, \hat{P}_2, \ldots, \hat{P}_K, \hat{W}_2, \ldots, \hat{W}_K\} = \underset{1 \leq i_2, \ldots, i_K \leq 2^M, 1 \leq j_1, \ldots, j_K \leq 2^N}{\operatorname{argmax}} \|H \cdot P\|^2 \quad \text{(Equation 14)}$$

$$P = [P_{j_1}^H, W_{i_2} P_{j_2}^H, L, W_{i_K} P_{j_K}^H]^H$$

where
K: the number of cells included in CoMP transmission
i: a codeword index in the inter-cell phase difference information
M: a codebook size in the inter-cell phase difference information (bits)
j: a codebook index in a PMI codebook
N: a codebook size of the PMI
H: the channel states of the plurality of cells, H=[H$_1$, H$_2$, ..., H$_K$].

5. The mobile terminal apparatus according to claim 4, wherein the measurement section measures the channel quality of the plurality of cells from the PMIs of the plurality of cells, the inter-cell phase difference information and the channel states of the plurality of cells.

6. The mobile terminal apparatus according to claim 5, wherein the measurement section determines the channel quality of the serving cell using the following equation 15 and determines the channel quality of the plurality of cells using the following equation 16:

[Formula 6]

$$\gamma^l_{SC} = f(\hat{P}_1, H_1) = P_T/L \cdot \|r^l \cdot H_1 \hat{P}_1\|^2/(N+ICI) \quad \text{(Equation 15)}$$

where
H$_1$: the channel state of the serving cell
P$_T$: transmission power from the radio base station apparatus
L: rank
r: received signal
l: layer index
N: average noise of a receiver in the mobile terminal apparatus
ICI: interference from cells other than the serving cell against the mobile terminal apparatus

[Formula 7]

$$\gamma^l_{JP} = g(\hat{P}_k, \hat{W}_k, H) = KP_T/L \cdot \|r^l \cdot HP\|^2/(N+ICI') \quad \text{(Equation 16)}$$

where
K: the number of cells included in CoMP transmission

P$_T$: transmission power from the radio base station apparatus
L: rank
r: received signal
H: the channel states of the plurality of cells, H=[H$_1$, H$_2$, ... H$_K$]
N: average noise of the receiver in the mobile terminal apparatus
ICI': interference from cells not belonging to a CoMP set, in the mobile terminal apparatus.

7. The mobile terminal apparatus according to claim 4, wherein the determining section determines the PMI of the serving cell using the following equation 17:

[Formula 8]

$$\hat{P}'_1 = \underset{1 \leq j_1 \leq 2^N}{\operatorname{argmax}} \|H_1 \cdot P_{j_1}\|^2 \quad \text{(Equation 17)}$$

where
j: the codebook index in the PMI codebook
N: the codebook size of the PMI
H$_1$: the channel state of the serving cell
P$_{j1}$: a codeword index in the serving cell.

8. The mobile terminal apparatus according to claim 7, wherein the measurement section determines the channel quality of the serving cell using the following equation 18, and determines the channel quality of the plurality of cells using the following equation 19:

[Formula 9]

$$\gamma^l_{SC} = f(\hat{P}'_1, H_1) = P_T/L \cdot \|r^l \cdot H_1 \hat{P}'_1\|^2/(N+ICI) \quad \text{(Equation 18)}$$

where
H$_1$: the channel state of the serving cell
P$_T$: transmission power from the radio base station apparatus
L: rank
r: received signal
l: layer index
N: average noise of the receiver in the mobile terminal apparatus
ICI: interference from cells other than the serving cell against the mobile terminal apparatus

[Formula 10]

$$\gamma^l_{JP} = g(\hat{P}_k, \hat{W}_k, H) = KP_T/L \cdot \|r^l \cdot HP\|^2/(N+ICI') \quad \text{(Equation 19)}$$

where
K: the number of cells included in CoMP transmission
P$_T$: transmission power from the radio base station apparatus
L: rank
r: received signal
H: the channel states of the plurality of cells, H=[H$_1$, H$_2$, ..., H$_K$]
N: average noise of the receiver in the mobile terminal apparatus
ICI': interference from cells not belonging to a CoMP set, in the mobile terminal apparatus.

9. A radio base station apparatus with a processor comprising:
a receiving section that receives an uplink signal including a PMI (Precoding Matrix Indicator) and inter-cell phase difference information;

a multiplying section that multiplies a transmission signal by a precoding weight of the PMI;

a phase difference adjusting section that adjusts phase differences between cells using the inter-cell phase difference information; and a transmission section that performs coordinated multiple-point transmission of the transmission signal, wherein the PMI and the inter-cell phase difference information are information that is determined from channel states of the plurality of cells that perform the coordinated multiple-point transmission, and wherein the PMI of a serving cell is determined from a channel state of the serving cell, and the combinations of the PMIs of other cells than the serving cell and the inter-cell phase difference information are determined from the channel states of the plurality of cells and the PMI of the serving cell, such that the throughput or the received SINR (Signal to Interference and Noise Ratio) is maximized; and wherein the the PMI of the serving cell is determined using the following equation 10, and the PMIs of the other cells and the inter-cell phase difference information are determined using the following equations 11:

[Formula 1]

$$\hat{P}_1 = \underset{1 \le j_1 \le 2^N}{\mathrm{argmax}} \|H_1 \cdot P_{j_1}\|^2 \qquad \text{(Equation 10)}$$

where
i: a codebook index of the PMI
N: a codebook size of the PMI (bits)
$H_1$: the channel state of the serving cell
$P_{j1}$: a codeword index in the serving cell

[Formula 2]

$$\{\hat{P}_2, \ldots, \hat{P}_K, \hat{W}_2, \ldots, \hat{W}_K\} = \qquad \text{(Equation 11)}$$
$$\underset{1 \le i_2, \ldots, i_K \le 2^M, 1 \le j_2, \ldots, j_K \le 2^N}{\mathrm{argmax}} \|H \cdot P\|^2$$
$$P = \left[\hat{P}_1^H, W_{i_2} P_{j_2}^H, L, W_{i_K} P_{j_K}^H\right]^H$$

where
K: the number of cells included in CoMP transmission
i: a codeword index in the inter-cell phase difference information
M: a codebook size in the inter-cell phase difference information (bits)
j: a codebook index in a PMI codebook
N: the codebook size of the PMI
H: the channel states of the plurality of cells, H=[$H_1$, $H_2$, ... $H_K$].

10. A radio communication method comprising, in a mobile terminal apparatus, the steps of:

estimating downlink channel states using reference signals included in downlink signals from a plurality of cells;

determining a PMI (Precoding Matrix Indicator) of each cell and inter-cell phase difference information, from channel states of the plurality of cells;

measuring channel quality from the determined PMIs and the inter-cell phase difference information; and transmitting the PMI of each cell, the inter-cell phase difference information and channel quality information, to a radio base station apparatus, wherein the PMI of a serving cell is determined from a channel state of the serving cell, and the combinations of the PMIs of other cells than the serving cell and the inter-cell phase difference information are determined from the channel states of the plurality of cells and the PMI of the serving cell, such that throughput or received SINR (Signal to Interference and Noise Ratio) is maximized; and wherein the PMI of the serving cell is determined using the following equation 10, and determines the PMIs of the other cells and the inter-cell phase difference information are determined using the following equations 11:

[Formula 1]

$$\hat{P}_1 = \underset{1 \le j_1 \le 2^N}{\mathrm{argmax}} \|H_1 \cdot P_{j_1}\|^2 \qquad \text{(Equation 10)}$$

where
j: a codebook index of the PMI
N: a codebook size of the PMI (bits)
$H_1$: the channel state of the serving cell
$P_{j1}$: a codeword index in the serving cell

[Formula 2]

$$\{\hat{P}_2, \ldots, \hat{P}_K, \hat{W}_2, \ldots, \hat{W}_K\} = \qquad \text{(Equation 11)}$$
$$\underset{1 \le i_2, \ldots, i_K \le 2^M, 1 \le j_2, \ldots, j_K \le 2^N}{\mathrm{argmax}} \|H \cdot P\|^2$$
$$P = \left[\hat{P}_1^H, W_{i_2} P_{j_2}^H, L, W_{i_K} P_{j_K}^H\right]^H$$

where
K: the number of cells included in CoMP transmission
i: a codeword index in the inter-cell phase difference information
M: a codebook size in the inter-cell phase difference information (bits)
j: a codebook index in a PMI codebook
N: the codebook size of the PMI
H: the channel states of the plurality of cells, H=[$H_1$, $H_2$, ..., $H_K$].

11. The radio communication method according to claim 10, further comprising, in the radio base station apparatus, the steps of:

receiving an uplink signal including the PMI and the inter-cell phase difference information;

multiplying a transmission signal by a precoding weight of the PMI;

adjusting phase differences between cells using the inter-cell phase difference information; and performing coordinated multiple-point transmission of the transmission signal with radio base station apparatuses of other cells.

12. A radio communication system to transmit transmission signals from radio base station apparatuses of a plurality of cells to a mobile terminal apparatus, wherein:

the mobile terminal apparatus with a processor comprises:
a channel estimator section that estimates channel states of the plurality of cells using reference signals included in downlink signals from the plurality of cells;

a PMI determining section that determines a PMI (Precoding Matrix Indicator) of each cell and inter-cell phase difference information, from the channel states of the plurality of cells;
a measurement section that measures channel quality from the determined PMIs and the inter-cell phase difference information; and
a transmitter that transmits the PMI of each cell, the inter-cell phase difference information and information about the channel quality, to a radio base station apparatus; and the radio base station apparatuses of the plurality of cells comprise:
a transmission signal generator that generates the transmission signals based on the PMI of each cell, the inter-cell phase difference information and the channel quality information transmitted from the mobile terminal apparatus; and
a transmitter that transmits the transmission signals to the mobile terminal apparatus,
wherein the PMI of a serving cell is determined from a channel state of the serving cell, and the combinations of the PMIs of other cells than the serving cell and inter-cell phase difference information are determined from the channel states of the plurality of cells and the PMI of the serving cell, such that throughput or received SINR (Signal to Interference and Noise Ratio) is maximized; and
wherein the PMI determining section determines the PMI of the serving cell using the following equation 10, and determines the PMIs of the other cells and the inter-cell phase difference information using the following equations 11:

[Formula 1]

$$\hat{P}_1 = \underset{1 \leq j_1 \leq 2^N}{\mathrm{argmax}} \|H_1 \cdot P_{j_1}\|^2 \quad \text{(Equation 10)}$$

where
j: a codebook index of the PMI
N: a codebook size of the PMI (bits)
$H_1$: the channel state of the serving cell
$P_{j1}$: a codeword index in the serving cell

[Formula 2]

$$\{\hat{P}_2, \ldots, \hat{P}_K, \hat{W}_2, \ldots, \hat{W}_K\} = \quad \text{(Equation 11)}$$
$$\underset{1 \leq i_2, \ldots, i_K \leq 2^M, 1 \leq j_2, \ldots, j_K \leq 2^N}{\mathrm{argmax}} \|H \cdot P\|^2$$
$$P = [\hat{P}_1^H, W_{i_2} P_{j_2}^H, L, W_{i_K} P_{j_k}^H]^H$$

where
K: the number of cells included in CoMP transmission
i: a codeword index in the inter-cell phase difference information
M: a codebook size in the inter-cell phase difference information (bits)
j: a codebook index in a PMI codebook
N: the codebook size of the PMI
H: the channel states of the plurality of cells, H=[$H_1$, $H_2$, ..., $H_K$].

13. A radio base station apparatus with a processor comprising:
a receiving section that receives an uplink signal including a PMI (Precoding Matrix Indicator) and inter-cell phase difference information;
a multiplying section that multiplies a transmission signal by a precoding weight of the PMI;
a phase difference adjusting section that adjusts phase differences between cells using the inter-cell phase difference information; and
a transmission section that performs coordinated multiple-point transmission of the transmission signal,
wherein the PMI and the inter-cell phase difference information are information that is determined from channel states of a plurality of cells that perform the coordinated multiple-point transmission, and
wherein the PMI of a serving cell is determined from the channel state of the serving cell, and the combinations of the PMIs of other cells than the serving cell and inter-cell phase difference information are determined from the channel states of the plurality of cells and the PMI of the serving cell, such that the throughput or the received SINR (Signal to Interference and Noise Ratio) is maximized,
wherein the PMIs of the cells and the inter-cell phase difference information are determined using the following equations 14:

[Formula 5]

$$\{\hat{P}_1, \hat{P}_2, \ldots, \hat{P}_K, \hat{W}_2, \ldots, \hat{W}_K\} = \quad \text{(Equation 14)}$$
$$\underset{1 \leq i_2, \ldots, i_K \leq 2^M, 1 \leq j_1, \ldots, j_K \leq 2^N}{\mathrm{argmax}} \|H \cdot P\|^2$$
$$P = [P_{j_1}^H, W_{i_2} P_{j_2}^H, L, W_{i_K} P_{j_k}^H]^H$$

where
K: the number of cells included in CoMP transmission
i: a codeword index in the inter-cell phase difference information
M: a codebook size in the inter-cell phase difference information (bits)
j: a codebook index in a PMI codebook
N: a codebook size of the PMI
H: the channel states of the plurality of cells, H=[$H_1$, $H_2$, ..., $H_K$].

14. A radio communication method comprising, in a mobile terminal apparatus, the steps of:
estimating downlink channel states using reference signals included in downlink signals from a plurality of cells;
determining a PMI (Precoding Matrix Indicator) of each cell and inter-cell phase difference information, from channel states of the plurality of cells;
measuring channel quality from the determined PMIs and the inter-cell phase difference information; and
transmitting the PMI of each cell, the inter-cell phase difference information and channel quality information, to a radio base station apparatus;
wherein the PMI of a serving cell is determined from the channel state of the serving cell, and the combinations of the PMIs of other cells than the serving cell and the inter-cell phase difference information are determined from the channel states of the plurality of cells and the PMI of the serving cell, such that throughput or received SINR (Signal to Interference and Noise Ratio) is maximized; and wherein the PMIs of the cells and the inter-cell phase difference information using the following equations 14:

[Formula 5]

$$\{\hat{P}_1, \hat{P}_2, \ldots, \hat{P}_K, \hat{W}_2, \ldots, \hat{W}_K\} = \underset{1 \leq i_2, \ldots, i_K \leq 2^M, 1 \leq j_1, \ldots, j_K \leq 2^N}{\operatorname{argmax}} \|H \cdot P\|^2$$

$$P = [P_{j_1}^H, W_{i_2} P_{j_2}^H, L, W_{i_K} P_{j_k}^H]^H$$

(Equation 14)

where
K: the number of cells included in CoMP transmission
i: a codeword index in the inter-cell phase difference information
M: a codebook size in the inter-cell phase difference information (bits)
j: a codebook index in a PMI codebook
N: a codebook size of the PMI
H: the channel states of the plurality of cells, H=[$H_1$, $H_2$, ..., $H_K$].

15. The radio communication method according to claim 14, further comprising, in the radio base station apparatus, the steps of:
receiving an uplink signal including the PMI and the inter-cell phase difference information;
multiplying a transmission signal by a precoding weight of the PMI;
adjusting phase differences between cells using the inter-cell phase difference information; and
performing coordinated multiple-point transmission of the transmission signal with radio base station apparatuses of other cells.

16. A radio communication system to transmit transmission signals from radio base station apparatuses of a plurality of cells to a mobile terminal apparatus, wherein:
the mobile terminal apparatus with a processor comprises:
a channel estimator section that estimates channel states of the plurality of cells using reference signals included in downlink signals from the plurality of cells;
a PMI determining section that determines a PMI (Precoding Matrix Indicator) of each cell and inter-cell phase difference information, from the channel states of the plurality of cells;
a measuring section that measures channel quality from the determined PMIs and the inter-cell phase difference information; and
a transmitter that transmits the PMI of each cell, the inter-cell phase difference information and information about the channel quality, to a radio base station apparatus; and
the radio base station apparatuses of the plurality of cells comprise:
a transmission signal generator that generates the transmission signals based on the PMI of each cell, the inter-cell phase difference information and the channel quality information transmitted from the mobile terminal apparatus; and
a transmitter that transmits the transmission signals to the mobile terminal apparatus,
wherein the PMI of a serving cell is determined from the channel state of the serving cell, and the combinations of the PMIs of other cells than the serving cell and the inter-cell phase difference information are determined from the channel states of the plurality of cells and the PMI of the serving cell, such that throughput or received SINR (Signal to Interference and Noise Ratio) is maximized; and
wherein the mobile terminal apparatus determines the PMIS of the plurality of cells and the inter-cell phase difference information using the following equations 14:

[Formula 5]

$$\{\hat{P}_1, \hat{P}_2, \ldots, \hat{P}_K, \hat{W}_2, \ldots, \hat{W}_K\} = \underset{1 \leq i_2, \ldots, i_K \leq 2^M, 1 \leq j_1, \ldots, j_K \leq 2^N}{\operatorname{argmax}} \|H \cdot P\|^2$$

$$P = [P_{j_1}^H, W_{i_2} P_{j_2}^H, L, W_{i_K} P_{j_k}^H]^H$$

(Equation 14)

where
K: the number of cells included in CoMP transmission
i: a codeword index in the inter-cell phase difference information
M: a codebook size in the inter-cell phase difference information (bits)
j: a codebook index in a PMI codebook
N: a codebook size of the PMI
H: the channel states of the plurality of cells, H=[$H_1$, $H_2$, ..., $H_k$].

* * * * *